(12) United States Patent
Iwai et al.

(10) Patent No.: US 10,708,954 B2
(45) Date of Patent: Jul. 7, 2020

(54) COMMUNICATION APPARATUS, TERMINAL STATION, AND COMMUNICATION METHOD FOR RANDOM ACCESS RESOURCE ALLOCATION

(71) Applicant: Panasonic Intellectual Property Management Co., Ltd., Osaka (JP)

(72) Inventors: Takashi Iwai, Ishikawa (JP);
Tomohumi Takata, Ishikawa (JP);
Yoshio Urabe, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/947,592

(22) Filed: Apr. 6, 2018

(65) Prior Publication Data

US 2018/0227950 A1 Aug. 9, 2018

Related U.S. Application Data

(63) Continuation of application No. PCT/JP2016/004238, filed on Sep. 16, 2016.

(30) Foreign Application Priority Data

Oct. 29, 2015 (JP) .................... 2015-212778
May 10, 2016 (JP) .................... 2016-094580
Jul. 13, 2016 (JP) .................... 2016-138373

(51) Int. Cl.
*H04W 74/08* (2009.01)
*H04L 1/00* (2006.01)
(Continued)

(52) U.S. Cl.
CPC ....... *H04W 74/0833* (2013.01); *H04L 1/0004* (2013.01); *H04W 72/02* (2013.01);
(Continued)

(58) Field of Classification Search
CPC ............ H04W 74/06; H04W 72/0413; H04W 74/0833; H04W 72/02; H04W 84/12;
(Continued)

(56) References Cited

U.S. PATENT DOCUMENTS 10,154,520 B1 * 12/2018 Hedayat ............ H04W 74/0833
2009/0170514 A1 7/2009 Yokoyama
(Continued)

FOREIGN PATENT DOCUMENTS

EP 2 557 884 A1 2/2013
EP 2814296 A1 12/2014
(Continued)

OTHER PUBLICATIONS

International Search Report of PCT application No. PCT/JP2016/004238 dated Nov. 29, 2016.
(Continued)

*Primary Examiner* — Tejis Daya
(74) *Attorney, Agent, or Firm* — Seed IP Law Group LLP

(57) ABSTRACT

A communication apparatus includes signal generation circuitry which, in operation, generates a control signal including a plurality of user specific fields, each of the plurality of user specific fields including an Association ID (AID) subfield for specifying a corresponding terminal station, and transmission circuitry which, in operation, transmits the control signal, wherein one of a plurality of AIDs for scheduled access or one of a plurality of random access IDs for random access is assigned to the AID subfield in each of the plurality of user specific fields, and each value of the plurality of random access IDs indicates a type of a terminal station which can perform random access to the at least one resource unit.

20 Claims, 34 Drawing Sheets

(51) Int. Cl.
*H04W 72/02* (2009.01)
*H04W 72/04* (2009.01)
*H04W 84/12* (2009.01)
*H04W 74/06* (2009.01)
H04W 74/00 (2009.01)
H04L 5/00 (2006.01)

(52) U.S. Cl.
CPC ....... *H04W 72/0413* (2013.01); *H04W 74/06* (2013.01); *H04W 74/08* (2013.01); *H04W 84/12* (2013.01); *H04L 5/0007* (2013.01); *H04W 74/006* (2013.01)

(58) Field of Classification Search
CPC .. H04W 74/08; H04W 74/006; H04L 1/0004; H04L 5/0007
See application file for complete search history.

(56) References Cited

U.S. PATENT DOCUMENTS

| | | | |
|---|---|---|---|
| 2009/0201868 A1* | 8/2009 | Chun | H04W 72/1278 370/329 |
| 2010/0142470 A1* | 6/2010 | Park | H04L 1/188 370/329 |
| 2010/0246510 A1* | 9/2010 | Ishii | H04W 74/008 370/329 |
| 2012/0281566 A1* | 11/2012 | Pelletier | H04W 76/27 370/252 |
| 2013/0058273 A1 | 3/2013 | Wentink et al. | |
| 2014/0003414 A1* | 1/2014 | Choudhury | H04W 74/006 370/347 |
| 2016/0057657 A1* | 2/2016 | Seok | H04L 69/324 370/476 |
| 2016/0128074 A1* | 5/2016 | Huang | H04L 69/22 370/329 |
| 2016/0302229 A1* | 10/2016 | Hedayat | H04B 7/0452 |
| 2016/0353435 A1* | 12/2016 | Ghosh | H04W 74/002 |
| 2016/0359653 A1* | 12/2016 | Lee | H04L 27/2613 |
| 2016/0374093 A1* | 12/2016 | Asterjadhi | H04W 28/0278 |
| 2017/0026151 A1* | 1/2017 | Adachi | H04W 72/005 |
| 2017/0070267 A1* | 3/2017 | Nabetani | H04B 7/0452 |
| 2017/0078052 A1* | 3/2017 | Matsuo | H04L 5/0007 |
| 2017/0196010 A1 | 7/2017 | Matsuo et al. | |
| 2017/0295541 A1* | 10/2017 | Kim | H04W 52/0216 |
| 2017/0295560 A1* | 10/2017 | Kim | H04W 84/12 |
| 2018/0020460 A1* | 1/2018 | Hedayat | H04L 27/2602 |
| 2018/0077735 A1* | 3/2018 | Ahn | H04L 5/0055 |
| 2018/0139635 A1* | 5/2018 | Oteri | H04W 74/006 |

FOREIGN PATENT DOCUMENTS

| | | |
|---|---|---|
| JP | 2009-159214 A | 7/2009 |
| JP | 2017-123550 A | 7/2017 |

OTHER PUBLICATIONS

IEEE 802.11-15/0875r1, "Random Access with Trigger Frames using OFDMA", Jul. 14, 2015.
IEEE 802.11-15/0843r1, "UL MU Random Access Analysis", Jul. 15, 2015.
IEEE 802.11-15/1107r0, "Power Save with Random Access", Sep. 13, 2015.
IEEE 802.11-15/1066r0, "HE-SIG-B Contents", Sep. 13, 2015.
IEEE Std 802.11(TM)-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.
Extended European Search Report, dated Oct. 2, 2018, for the related European Patent Application No. 16859247.5, 9 pages.
Chittabrata Ghosh (Intel): "Random Access with Trigger Frames using OFDMA ; 11-15-0604-00-00ax-random-access-with-trigger-frames-using-ofdrna", IEEE Draft; 11-15-0604-00-00AX-Random-Access-With-Trigger- Frames-Using-OFDMA, IEEE-SA Mentor, Piscataway, NJ USA, vol. 802.11ax, May 11, 2015 (May 11, 2015), pp. 1-16, XP068094472, [retrieved on May 11, 2015].
The Extended European Search Report dated Jan. 20, 2020 for the related European Patent Application No. 16859247.5.
Chittabrata Ghosh, "Random Access with Trigger Frames using OFDMA", IEEE802.11-15/0875r1, Jul. 13, 2015 (Jul. 13, 2015), Internet <URL :https://mentor.ieee.org/802.15/dcn/15/15-15-0875-01-007a-discussion-on-channel-model-for-b4.pptx>.

* cited by examiner

| RA ID | RECEPTION QUALITY |
|---|---|
| 2008 | HIGH (SNR ≥ 10 dB) |
| 2009 | LOW (SNR < 10 dB) |

FIG. 9

| USE PURPOSE OF RA (1 bit) | RECEPTION QUALITY |
|---|---|
| 0 | HIGH (SNR $\geq$ 10 dB) |
| 1 | LOW (SNR $<$ 10 dB) |

| RA ID | PATH LOSS |
|---|---|
| 2008 | LARGE (PATH LOSS ≥ 70 dB) |
| 2009 | SMALL (PATH LOSS < 70 dB) |

| RA ID | RECEPTION QUALITY | MCS |
|---|---|---|
| 2008 | HIGH (SNR ≥ 10 dB) | QPSK, 1/2 (HIGH RATE) |
| 2009 | LOW (SNR < 10 dB) | BPSK, 1/2 (LOW RATE) |

| RA ID | RA TYPE |
|---|---|
| 2008 | TYPE A:<br>NOTIFICATION OF TRANSMISSION<br>BUFFER INFORMATION<br>(IMPORTANCE LEVEL: HIGH) |
| 2009 | TYPE B:<br>DL Data REQUEST<br>(IMPORTANCE LEVEL: LOW) |

FIG. 19

| RA ID | RA TYPE | RECEPTION QUALITY |
|---|---|---|
| 2008 | TYPE A: NOTIFICATION OF TRANSMISSION BUFFER INFORMATION | HIGH |
| 2009 | | LOW |
| 2010 | TYPE B: DL Data REQUEST | HIGH |
| 2011 | | LOW |

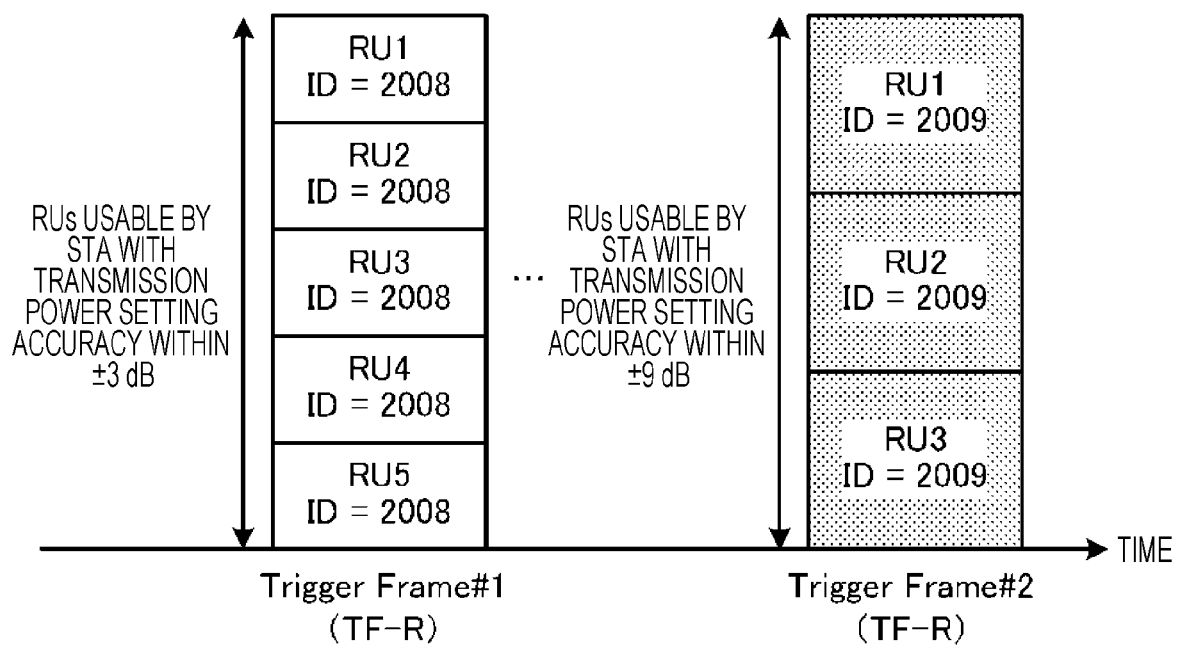

FIG. 23

| RA ID | RECEPTION QUALITY |
|---|---|
| 2008 | HIGH |
| 2009 | LOW |
| 2010 | ANY |

FIG. 27

| AID | RA TYPE | Type dependent Per User info subfield |
|---|---|---|
| 0 | RA FOR DATA TRANSMISSION | • MPDU MU Spacing Factor<br>• TID Aggregation Limit |
| X<br>(e.g. X=2008) | RA FOR SPECIFIC USE | • RA purpose<br>• Restriction Info<br>• MPDU MU Spacing Factor<br>• TID Aggregation Limit |

FIG. 29

| AID | RA TYPE | Reserved IN Type dependent Per User info |
|---|---|---|
| 0 | RA FOR DATA TRANSMISSION | Reserved |
| X (e.g. X=2008) | RA FOR SPECIFIC USE | RA purpose |

FIG. 31

| AID | RA TYPE | MCS subfield | SS Allocation subfield |
|---|---|---|---|
| 0 | RA FOR DATA TRANSMISSION | MCS | SS Allocation |
| X (e.g. X=2008) | RA FOR SPECIFIC USE | Restriction Info | RA purpose |

FIG. 33

| AID | ACCESS TYPE | Type dependent Per User info subfield |
|---|---|---|
| 1 TO 2007 | Scheduled access | • MPDU MU Spacing Factor<br>• TID Aggregation Limit |
| 0 | Random access | • RA purpose<br>• Restriction Info<br>• MPDU MU Spacing Factor<br>• TID Aggregation Limit |

COMMUNICATION APPARATUS, TERMINAL STATION, AND COMMUNICATION METHOD FOR RANDOM ACCESS RESOURCE ALLOCATION

BACKGROUND

1. Technical Field

The present disclosure relates to a communication apparatus, a terminal station, and a communication method.

2. Description of the Related Art

Task Group ax of IEEE (the Institute of Electrical and Electronics Engineers) 802.11 Working Group has been developing the IEEE 802.11ax (hereinafter referred to as "11ax") technical specification, which is a successor to 802.11ac. OFDMA (Orthogonal frequency-division multiple access) based random access (RA: Random Access) is likely to be introduced into 11 ax.

An access point (also referred to as a "base station") transmits a random access control signal (hereinafter referred to as "TF (Trigger frame) -R") to a plurality of terminals (also referred to as terminal stations or "STAs (Stations)") that the access point accommodates. TF-R includes RU information indicating a transmission frequency resource for random access (hereinafter referred to as a "Resource unit (RU)"). A terminal that transmits a UL response signal (also referred to as a "UL (Uplink) response frame") through random access selects one of the plurality of random access RUs indicated by the RU information for random access (RA RUs) included in TF-R at random and transmits a UL response signal by using the selected RU (refer to, for example, IEEE 802.11-15/0875r1 "Random Access with Trigger frames using OFDMA").

For the 11ax, various random access applications are being studied. Two applications of random access which have been studied are described below.

The first use of random access is to notify the access point of uplink transmission buffer information (also referred to as "Buffer Status Information") (refer to, for example, IEEE 802.11-15/0843r1 "UL MU Random Access Analysis").

The access point allows a plurality of terminals to perform random access by TF-R. A terminal having uplink data (UL Data) in the transmission buffer randomly selects one RU from among the RA RUs specified by the TF-R. Thereafter, the terminal transmits a UL response signal including the transmission buffer information to the access point by using the selected RU. The access point can get to know the transmission buffer state of each of terminals on the basis of the transmission buffer information received through random access and, thus, can efficiently schedule the UL Data after random access.

The second use of random access is to transmit an uplink signal by OFDMA even when a terminal operating in a power saving mode (also referred to as a "Power Saving (PS) terminal") returns from the power saving state, and the access point does not know that the terminal holds uplink data in the transmission buffer. This use can prevent a decrease in transmission efficiency caused by a plurality of terminals performing uplink transmission separately as a single user (SU) (refer to, for example, IEEE 802.11-15/1107r0 "Power Save with Random Access").

SUMMARY

However, as the amount of information of the control signal (the UL response signal) transmitted by a terminal increases due to the above-described random access, the resource (for example, the time length) required for transmitting the UL response signal increases. Consequently, the resource used to transmit UL/DL Data decreases and, thus, the system throughput decreases. In contrast, if the amount of information of the control signal transmitted through random access decreases, efficient scheduling of the UL/DL Data transmission after the random access cannot be performed. As a result, the system throughput decreases.

One non-limiting and exemplary embodiment facilitates providing a communication apparatus, a terminal station, and a communication method capable of increasing the system throughput without an increase in the amount of information of a control signal transmitted through random access.

In one general aspect, the techniques disclosed here feature a communication apparatus including signal generation circuitry which, in operation, generates a control signal including a plurality of user specific fields, each of the plurality of user specific fields including an Association ID (AID) subfield for specifying a corresponding terminal station, and a resource unit allocation subfield indicating at least one resource unit available for the corresponding terminal station, and transmission circuitry which, in operation, transmits the control signal, wherein one of a plurality of AIDs for scheduled access or one of a plurality of random access IDs for random access is assigned to the AID subfield in each of the plurality of user specific fields, values for the plurality of random access IDs are different from any of values of the plurality of the AIDs for the scheduled access, and each value of the plurality of random access IDs indicates a type of a terminal station which can perform random access to the at least one resource unit.

According to an embodiment of the present disclosure, the system throughput can be increased without increasing the amount of information of a control signal transmitted by random access.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 illustrates another example of the TF-R according to Setting Method 1 of the first embodiment;

FIG. 19 illustrates an example of an RA ID table according to another embodiment;

FIG. 22A illustrates an example of an RA ID table according to Setting Method 10 of the fourth embodiment;

FIG. 22B illustrates an example of a TF-R according to Setting Method 10 of the fourth embodiment;

FIG. 23 illustrates an example of an RA ID table according to another embodiment;

FIG. 27 illustrates an RA ID table according to example 1;

FIG. 29 illustrates an RA ID table according to example 2;

FIG. 31 illustrates the RA ID table according to example 3;

FIG. 33 illustrates the RA ID table according to example 4; and

DETAILED DESCRIPTION

Figure 1:
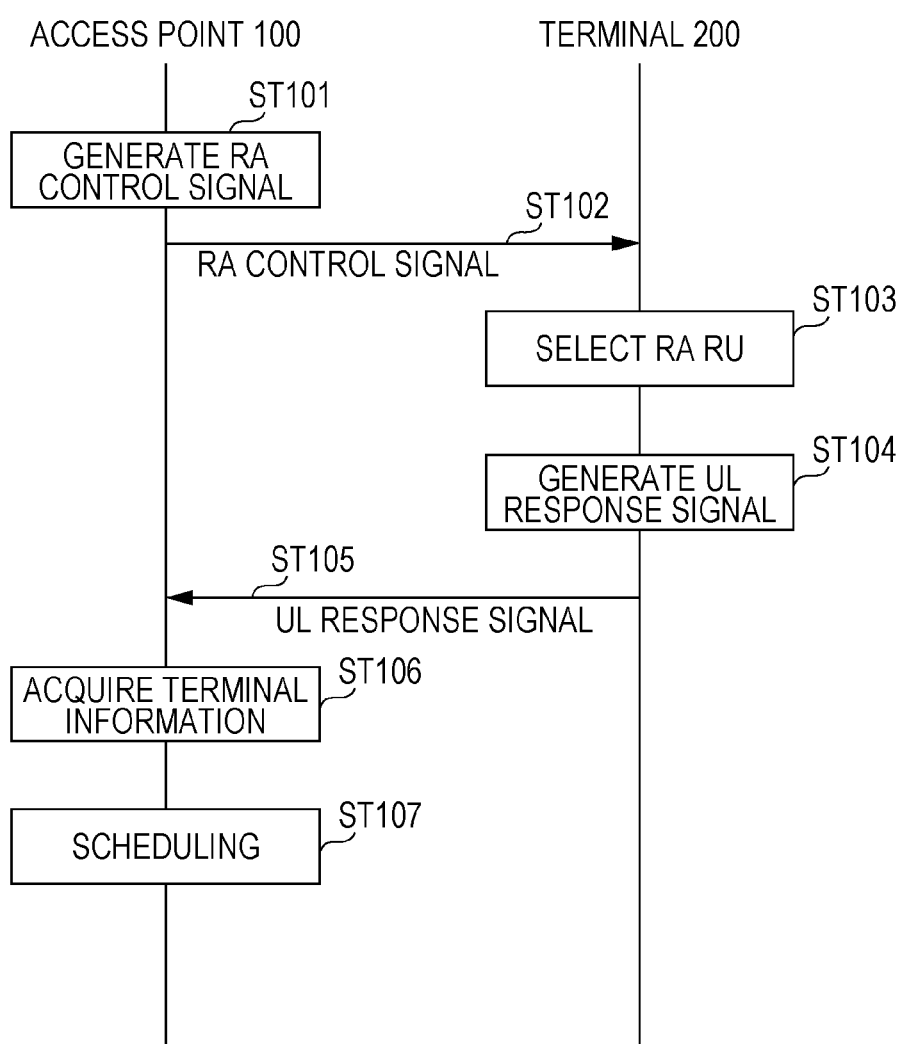
FIG. 1 is a flow diagram illustrating the operations performed by an access point and a terminal according to a first embodiment.

Embodiments of the present disclosure are described in detail below with reference to the accompanying drawings. In the embodiments, the same constituent elements are denoted by the same reference numerals. Since the descriptions of the same constituent elements are the same, the description is not repeated.

First Embodiment

Overview of Communication System

The communication system according to the present embodiment includes an access point 100 (a communication apparatus) and a terminal 200. The access point 100 is an access point that supports 11ax, and the terminal 200 is a terminal that supports 11ax.

FIG. 1 illustrates the processing flow of the communication system according to the present embodiment.

In FIG. 1, the access point 100 generates a random access (RA) control signal (TF-R) (step (hereinafter referred to as "ST") 101).

At this time, in a scheduled UL Data control signal (TF: Trigger Frame), a unique ID (STA_ID) for uniquely identifying one of the terminals 200 is used to clearly indicate the allocation of the RU. That is, each of the terminals 200 determines that an RU having an ID of the terminal 200 itself assigned thereto is an available RU. In contrast, in the RA control signal (TF-R), a random access (RA) ID is used to clearly indicate the allocation of the random access (RA) RU. According to the present embodiment, a plurality of RA IDs are defined.

As an RA ID, an ID which is not assigned to uniquely identify a specific terminal 200 is used. More specifically, as an STA_ID, an Association ID (AID) which is a unique ID assigned at the time of association to a network (BSS: Basic Service Set, a plurality of terminals 200 under the control of the access point 100) to which the access point 100 belongs may be used. As an RA ID, a spare value (a reserved value) not ordinarily used for AID may be used.

In addition, according to the present embodiment, terminal information, such as the communication state (e.g., the reception quality, path loss, RSSI, interference power of the terminal) is uniquely associated with the RA ID indicating the allocation of each of the RA RUs. That is, for the RUs each having one of the RA IDs assigned thereto, the terminals 200 that can use (access) the RU are limited in accordance with the terminal information. For example, according to the standard, the correspondence relationship between an RA ID and terminal information may be predetermined in the form of a prescribed RA ID table in advance, and the RA ID table may be shared between the access point 100 and the terminal 200. Furthermore, the RA ID table may be changed from the prescribed values by the following method. That is, the RA ID table (or a change in the RA ID table) may be notified to the terminal 200 by using Management frame, such as Beacon, Probe Response, or Association Response or may be included in the RA control signal and be notified to the terminal 200. As the RA ID, a value suitable for each of BSSs can be set by controlling the RA ID with the Management frame. Alternatively, the RA ID table may be changed by using TF-R. If the RA ID table is controlled each time TF-R is transmitted, the overhead increases. However, in an environment where the situation of the terminal 200 greatly fluctuates, control appropriate to follow the fluctuation can be provided.

Returning back to FIG. 1, the generated RA control signal is wirelessly notified to the terminal 200 by the access point 100 (ST102).

The terminal 200 identifies available RUs from among the RA RUs indicated in the RA control signal notified (broadcasted) by the access point 100 in accordance with its own terminal information. More specifically, the terminal 200 refers to the RA ID table shared with the access point 100 and identifies an RA ID associated with its own terminal information (for example, information regarding the reception quality, path loss, RSSI, or interference power). Thereafter, as the available RUs, the terminal 200 identifies, from among the RA RUs indicated by the RA control signal, the ones allocated by the ID that is the same as the RA ID identified by using the RA ID table. Subsequently, the terminal 200 randomly selects one of the available RUs (ST103).

The terminal 200 generates a UL response signal (for example, transmission buffer information or a DL Data request signal) to be transmitted through random access (ST104).

The generated UL response signal is wirelessly notified to the access point 100 by the terminal 200 using the RA RU selected in ST103 (ST105).

Upon receiving the UL response signal transmitted from the terminal 200 and correctly decoding the received UL response signal, the access point 100 refers to the RA ID table shared with the terminal 200 and obtains the terminal information on the basis of the RA ID associated with the RA RU used for transmitting the UL response signal (ST106).

The access point 100 performs scheduling (for example, frequency allocation, MCS selection, and transmission power control) of DL Data/UL Data on the basis of the obtained terminal information (ST107).

The processing flow of the communication system according to the present embodiment has been described above.

Figure 2:
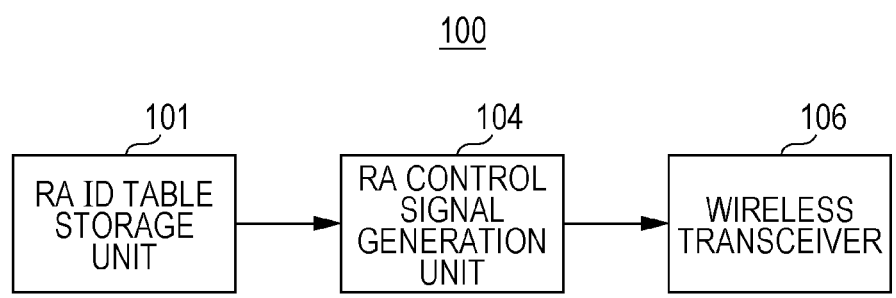
FIG. 2 is a block diagram illustrating the main configuration of the access point according to the first embodiment.

FIG. 2 is a block diagram illustrating the main configuration of the access point 100 according to the present embodiment. In the access point 100 illustrated in FIG. 2, an RA ID table storage unit 101 stores a plurality of random access IDs (RA IDs) used to instruct the terminal 200 which random access transmission frequency resources (RA RUs) to use. Note that each of the plurality of random access IDs is uniquely associated with the state of communication between the access point 100 and the terminal 200 that performs random access. An RA control signal generation unit 104 generates a random access control signal (TF-R) including allocation information indicating at least one transmission frequency resource. Note that each of the at least one transmission frequency resource has one of a plurality of random access IDs assigned thereto. A wireless transceiver 106 transmits a random access control signal.

Figure 3:
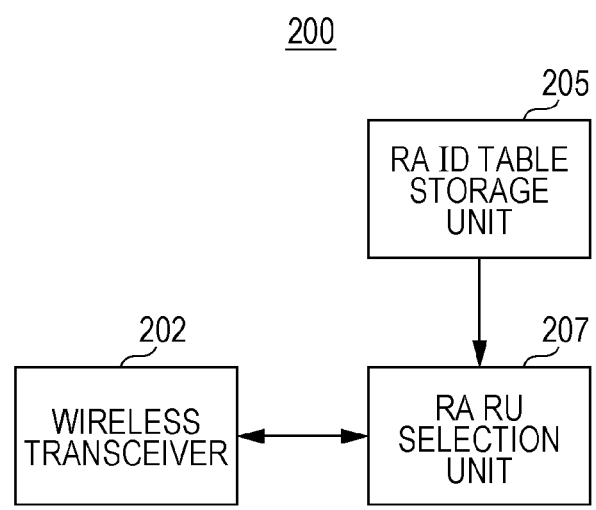
FIG. 3 is a block diagram illustrating the main configuration of the terminal according to the first embodiment.
Figure 4:
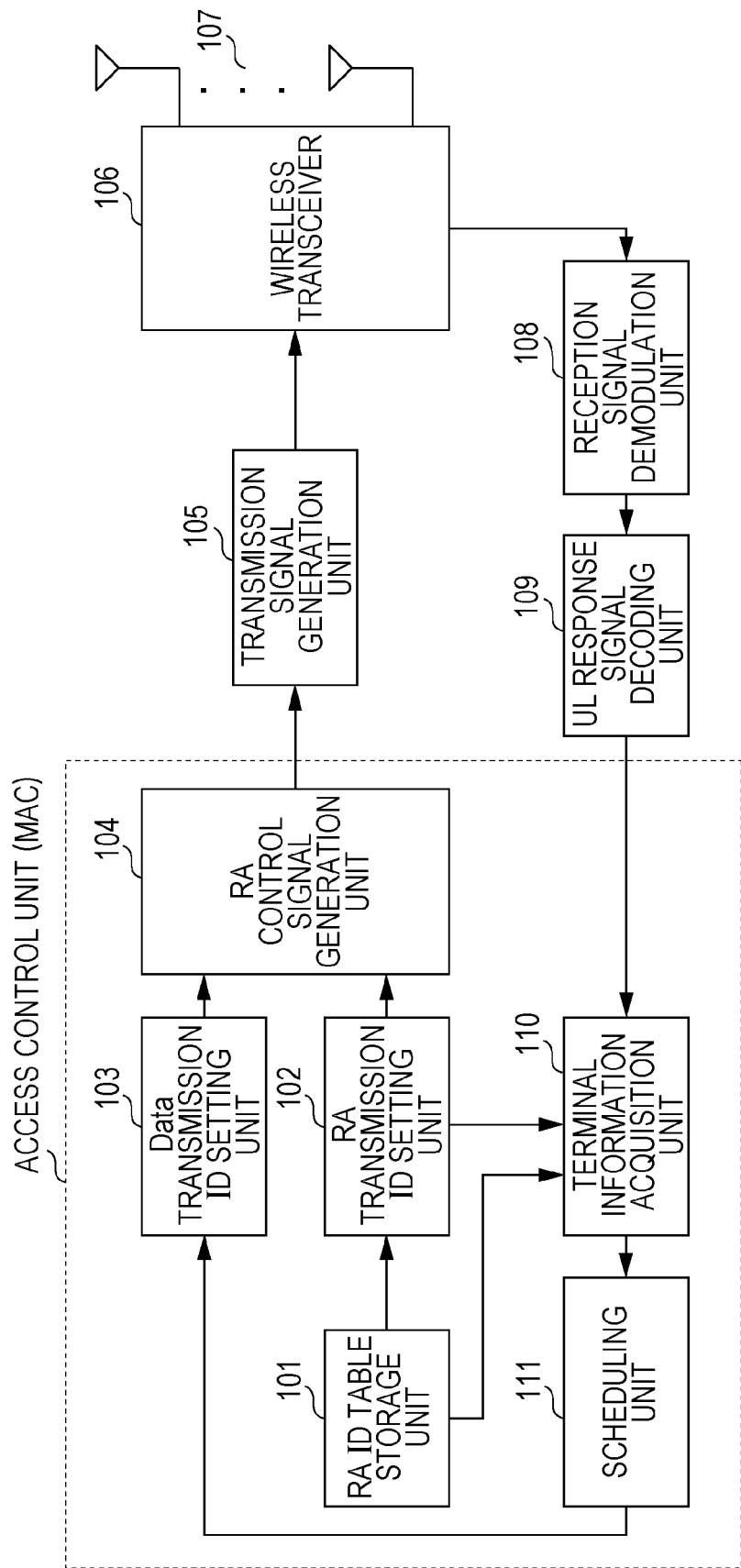
FIG. 4 is a block diagram illustrating the configuration of the access point according to the first embodiment.

FIG. 3 is a block diagram illustrating the main configuration of the terminal 200 according to the present embodiment. In the terminal 200 illustrated in FIG. 3, an RA ID table storage unit 205 stores a plurality of random access IDs (RA IDs) used to instruct the terminal 200 which random access transmission frequency resources (RA RUs) to use. Note that each of the plurality of random access IDs is uniquely associated with the state of communication between the terminal 200 that performs random access and the access point 100. A wireless transceiver 202 receives a random access control signal (TF-R) including allocation information indicating at least one transmission frequency resource. Note that each of the at least one transmission frequency resource has one of a plurality of random access IDs assigned thereto. From among the at least one transmission frequency resource, an RA RU selection unit 207 selects one of the transmission frequency resources to which the random access ID associated with the communication state of the terminal 200 is assigned. The wireless transceiver 202 transmits a random access signal (a UL response signal) by using the selected transmission frequency resource. Configuration of Access Point FIG. 4 is a block diagram illustrating the configuration of the access point 100 according to the present embodiment. In FIG. 4, the access point 100 includes the RA ID table storage unit 101, an RA transmission ID setting unit 102, a data transmission ID setting unit 103, the RA control signal generation unit 104, a transmission signal generation unit 105, the wireless transceiver 106, an antenna 107, a reception signal demodulation unit 108, a UL response signal decoding unit 109, a terminal information acquisition unit 110, and a scheduling unit 111. The wireless transceiver 106 includes a transmission unit and a reception unit. Note that the RA ID table storage unit 101, the RA transmission ID setting unit 102, the data transmission ID setting unit 103, the RA control signal generation unit 104, the terminal information acquisition unit 110, and the scheduling unit 111 constitute an access control (MAC: Media Access Control) unit.

The RA ID table storage unit 101 stores an RA ID table in which the communication state (e.g., the reception quality, path loss, RSSI, or interference power) of each of the terminals 200 that perform random access is uniquely associated with one of the plurality of RA IDs used to instruct the terminal 200 which RA RUs to use. The RA ID table is shared between the access point 100 and the terminal 200. Note that the RA ID is a common ID among the plurality of terminals 200. Consequently, conflict among UL response signals transmitted using the same RA ID may occur at the time of reception in the access point 100. A method for setting the RA ID table is described below.

The RA transmission ID setting unit 102 selects, from among the plurality of RA IDs defined in the RA ID table stored in the RA ID table storage unit 101, RA IDs used to instruct the terminal 200 which RA RUs to use and sets the RA IDs as the RA IDs for the terminal 200. Note that one or more RA RUs are set for each of frames, and the selected RA IDs are assigned to the respective RA RUs. As described above, since the RA ID and the communication state of the terminal are associated with each other in the RA ID table, the terminal 200 that can use the RA RU is limited in accordance with the RA ID (that is, the communication state) assigned to the RA RU. The RA transmission ID setting unit 102 outputs, to the RA control signal generation unit 104 and the terminal information acquisition unit 110, allocation information indicating the RA IDs each having an RA RU assigned thereto.

The data transmission ID setting unit 103 sets a terminal ID (AID) for indicating the RU for UL Data scheduled by the scheduling unit 111 described below (the RU that does not cause conflict). The ID set by the data transmission ID setting unit 103 is an ID uniquely identifying a terminal among the terminals 200 connected to the access point 100. Consequently, the UL Data transmitted from the terminals 200 do not conflict with one another at the time of reception in the access point 100.

The RA control signal generation unit 104 generates an RA control signal for requesting the terminal 200 to transmit the UL Data or the UL response signal. The RA control signal includes frequency resource (RU) allocation pattern information (terminal common information) in the system band, allocation information for RUs (terminal specific information), and the like. The allocation information for RUs includes the RA ID set by the RA transmission ID setting unit 102 or the UL Data ID (AID) set by the data transmission ID setting unit 103. In addition, the RA control signal includes information necessary for the terminal 200 to generate the UL signal, such as the MCS (Modulation and Coding scheme) of the UL signal (UL Data or a UL response signal) or transmission power information.

The transmission signal generation unit 105 performs encoding and modulation processing on the RA control signal input from the RA control signal generation unit 104. Thereafter, the transmission signal generation unit 105 adds, to the modulated signal, control signals (also referred to as a "preamble"), such as a pilot signal and a channel estimation signal used for frequency synchronization and timing synchronization at the receiving side (terminal 200) to generate a radio frame (a transmission signal). Thereafter, the transmission signal generation unit 105 outputs the radio frame to the wireless transceiver 106.

The wireless transceiver 106 performs predetermined radio transmission processing (e.g., D/A conversion on the signal input from the transmission signal generation unit 105 and up-conversion on the carrier frequency). Thereafter, the wireless transceiver 106 transmits the signal subjected to the radio transmission processing via the antenna 107.

Upon receiving, from the terminal 200, a UL response signal (a response signal in response to the RA control signal transmitted by the access point 100), the access point 100 operates as follows. That is, the radio signal received via the antenna 107 is input to the wireless transceiver 106. The wireless transceiver 106 performs predetermined radio reception processing, such as down-conversion of the carrier frequency, on the radio signal and outputs the signal subjected to the radio reception processing to the reception signal demodulation unit 108.

The reception signal demodulation unit 108 extracts the received radio frame through, for example, autocorrelation processing. Thereafter, the reception signal demodulation unit 108 outputs the radio frame to the UL response signal decoding unit 109.

Upon receiving the radio frame input from the reception signal demodulation unit 108, the UL response signal decoding unit 109 demodulates and decodes the UL response signal included in any one of the RA RUs indicated by the RA control signal. If there is no reception error in the UL response signal, the UL response signal decoding unit 109 outputs, to the terminal information acquisition unit 110, the data included in the UL response signal (the terminal ID, transmission information of the terminal 200 (e.g., transmission buffer information or a DL Data request)) and information indicating the RU by which the UL response signal was received (hereinafter referred to as "reception RU"). However, if there is a reception error in the UL response signal, the UL response signal decoding unit 109 outputs nothing to the terminal information acquisition unit 110.

The terminal information acquisition unit 110 acquires the terminal ID of the terminal 200 that has transmitted the UL response signal through random access and the communication state (e.g., the reception quality, the path loss, the RSSI, or the interference power) of the terminal 200 on the basis of the terminal ID and the reception RU input from the UL response signal decoding unit 109, the allocation information (the correspondence relationship between the RA ID and the RA RU) input from the RA transmission ID setting unit 102, and the RA ID table (the correspondence relationship between the RA ID and the communication state) stored in the RA ID table storage unit 101. More specifically, the terminal information acquisition unit 110 identifies the RA ID corresponding to the reception RU on the basis of the correspondence relationship between the RA ID and the RA RU indicated by the allocation information and identifies the communication state associated with the identified RA ID as the communication state of the terminal 200.

The scheduling unit 111 performs scheduling (e.g., frequency allocation, MCS selection, transmission power control) of DL Data/UL Data after random access on the basis of the communication state of the terminal 200 input from the terminal information acquisition unit 110.

Configuration of Terminal

Figure 5:
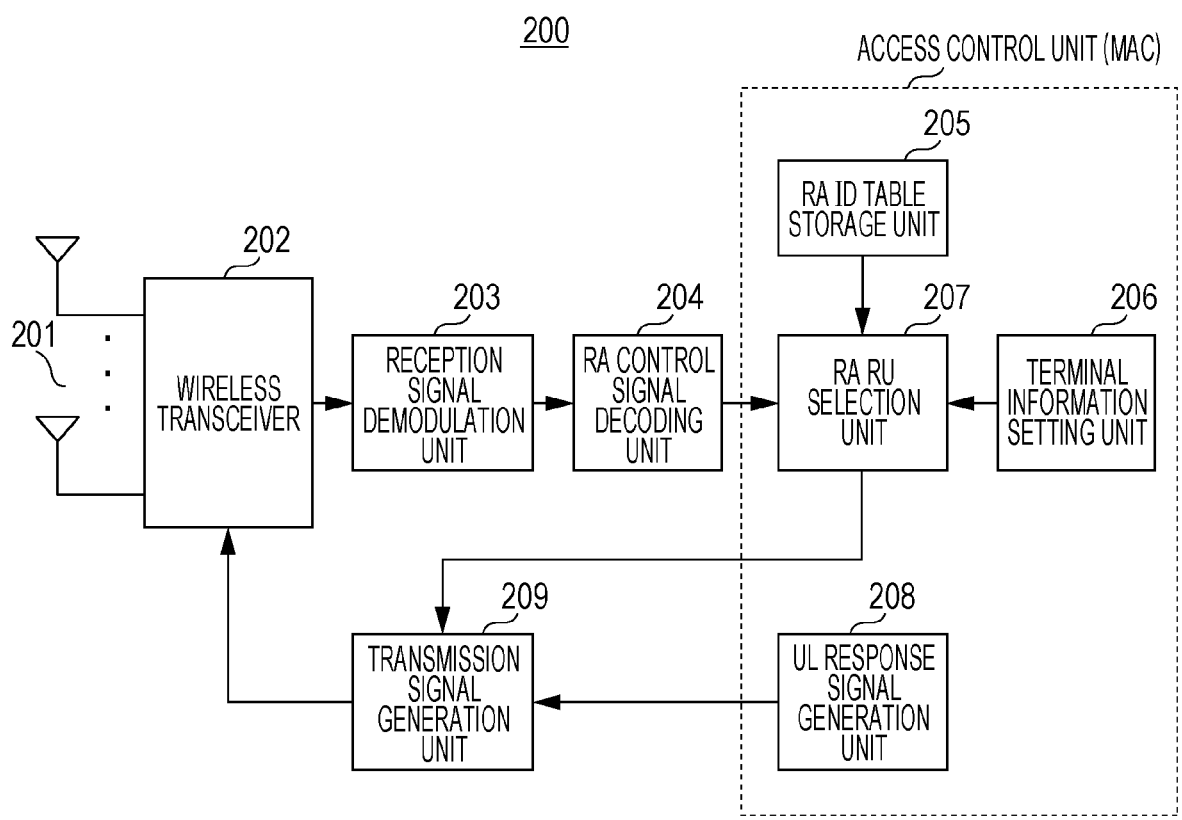
FIG. 5 is a block diagram illustrating the configuration of the terminal according to the first embodiment.

FIG. 5 is a block diagram illustrating the configuration of the terminal 200 according to the present embodiment. In FIG. 5, the terminal 200 includes an antenna 201, a wireless transceiver 202, a reception signal demodulation unit 203, an RA control signal decoding unit 204, an RA ID table storage unit 205, a terminal information setting unit 206, an RA RU selection unit 207, a UL response signal generation unit 208, and a transmission signal generation unit 209. The wireless transceiver 202 includes a transmission unit and a reception unit. Note that the RA ID table storage unit 205, the terminal information setting unit 206, the RA RU selection unit 207, and the UL response signal generation unit 208 constitute an access control unit (MAC).

The wireless transceiver 202 receives the signal transmitted from the access point 100 (FIG. 4) via the antenna 201, performs predetermined radio reception processing, such as down-conversion and A/D conversion, on the received signal, and outputs the signal subjected to the radio reception processing to the reception signal demodulation unit 203. In addition, the wireless transceiver 202 performs predetermined radio transmission processing, such as D/A conversion on the signal input from the transmission signal generation unit 209 and up-conversion on the carrier frequency, which is described below. Thereafter, the wireless transceiver 202 transmits the signal subjected to the radio transmission processing via the antenna 201

The reception signal demodulation unit 203 extracts the received radio frame by, for example, autocorrelation processing and outputs the frame to the RA control signal decoding unit 204.

The RA control signal decoding unit 204 demodulates and decodes the RA control signal included in the transmission RU for the RA control signal in the radio frame input from the reception signal demodulation unit 203 and outputs, to the RA RU selection unit 207, the allocation information for RUs (terminal specific information) included in the RA control signal.

The RA ID table storage unit 205 stores an RA ID table that is the same as the RA ID table held by the access point 100. That is, in the RA ID table of the RA ID table storage unit 205, the communication state of a terminal 200 that performs random access and one of the plurality of RA IDs are uniquely associated with each other.

The terminal information setting unit 206 acquires the communication state (e.g., the reception quality, path loss, RSSI, or interference power) of the terminal including the terminal information setting unit 206 and sets the communication state as the terminal information.

The RA RU selection unit 207 determines, from among the plurality of RUs indicated by the allocation information input from the RA control signal decoding unit 204, the RUs available for the terminal 200 to use as RA RUs on the basis of the RA ID table stored in the RA ID table storage unit 205 and the terminal information of the terminal 200 (the communication state (e.g., the reception quality, path loss, RSSI, or interference power)) input from the terminal information setting unit 206. More specifically, the RA RU selection unit 207 identifies the RA ID associated with the communication state of the terminal 200 indicated by the terminal information set by the terminal information setting unit 206 on the basis of the RA ID table. Thereafter, the RA RU selection unit 207 determines the RU corresponding to the identified RA ID among the plurality of RUs input from the RA control signal decoding unit 204 as the RUs usable by the terminal 200 as the RA RU. That is, the RA RU selection unit 207 determines the RA RUs corresponding to the communication state of the terminal 200 as available RUs.

Subsequently, the RA RU selection unit 207 randomly selects one of the RA RUs that the terminal 200 has determined to be available and outputs information indicating the selected RU to the transmission signal generation unit 209.

The UL response signal generation unit 208 generates a UL response signal including the terminal ID of the terminal 200 and transmission information (e.g., the transmission buffer information or a DL Data request) of the terminal 200 and outputs the UL response signal to the transmission signal generation unit 209.

The transmission signal generation unit 209 performs encoding and modulation on the UL response signal input from the UL response signal generation unit 208. Thereafter, the transmission signal generation unit 209 adds, to the modulated signal, control signals (preambles) used for frequency synchronization and timing synchronization on the reception side (the access point 100), such as a pilot signal and a channel estimation signal, to generate a radio frame (a transmission signal). Thereafter, the transmission signal generation unit 209 outputs the radio frame to the wireless transceiver 202. Note that the UL response signal is mapped to the RA RU indicated by the information input from the RA RU selection unit 207.

Method for Setting RA ID Table

A method for setting the above-described RA ID table held by the access point 100 and the terminal 200 is described in detail below.

Hereinafter, each of RA ID table Setting Methods 1 to 3 is described.

Setting Method 1

Figures 6A, 6B:
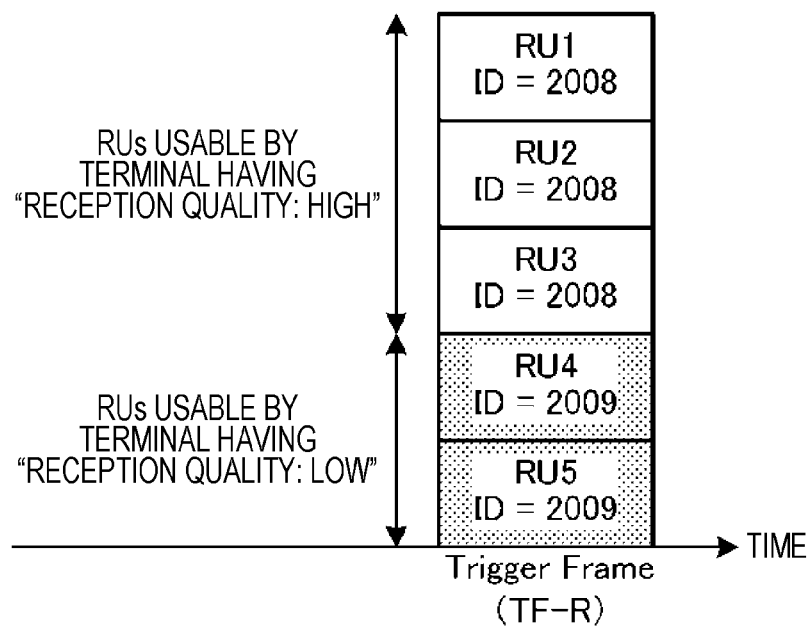
FIG. 6A illustrates an example of an RA ID table according to Setting Method 1 according to the first embodiment.
FIG. 6B illustrates an example a TF-R according to Setting Method 1 according to the first embodiment.

An RA ID table is described in Setting Method 1 in which the reception quality (for example, SNR: Signal to Noise Ratio) of the terminal 200 that performs random access and an RA ID are uniquely associated with each other. FIG. 6A illustrates an example of the RA ID table according to Setting Method 1. FIG. 6B illustrates an example of TF-R including an RA control signal to be notified to the terminal 200 by the access point 100 according to Setting Method 1.

In the RA ID table illustrated in FIG. 6A, when the reception quality is high (for example, the SNR is 10 dB or higher), an RA ID=2008 is associated with the reception quality. When the reception quality is low (for example, the SNR is lower than 10 dB), an RA ID=2009 is associated with the reception quality.

In the example illustrated in FIG. 6B, in the allocation information for RUs included in the RA control signal, RU 1 to RU 5 are set as RA RUs. In addition, in FIG. 6B, an RA ID=2008 is assigned to each of RU 1 to RU 3, and an RA ID=2009 is assigned to each of RU 4 to RU 5. In other words, in FIG. 6B, RU 1 to RU 3 are RUs that are usable by the terminals 200 with high reception quality, and RU 4 to RU 5 are RUs that are usable by the terminals 200 with low reception quality.

For example, a terminal 200 with high reception quality refers to the RA ID table illustrated in FIG. 6A and identifies an RA ID=2008 corresponding to reception quality of the terminal 200 itself and determines that among RU 1 to RU 5 notified by the TF-R illustrated in FIG. 6B, RU 1 to RU 3 corresponding to an RA ID=2008 are usable RA RUs. Thereafter, the terminal 200 randomly selects one from among the usable RU 1 to RU 3 and transmits the UL response signal by using the selected RU.

In addition, upon receiving the UL response signal transmitted by the terminal 200 (the reception quality: high), the access point 100 identifies the RA ID corresponding to the RU (the reception RU) by which the UL response signal was received among the RU 1 to RU 5 illustrated in FIG. 6B (in this case, an RA ID=2008 is identified). Thereafter, the access point 100 refers to the RA ID table illustrated in FIG. 6A and determines that the reception quality ("high") corresponding to the identified RA ID=2008 is the reception quality of the terminal 200. Thereafter, the access point 100 performs scheduling for the terminal 200 by using the acquired reception quality of the terminal 200 and the transmission information indicated by the UL response signal.

Note that, transmission and reception of a UL response signal are performed by a terminal 200 with low reception quality in the same manner as described above.

That is, by selecting the RA RU to be used for transmission of the UL response signal in accordance with the reception quality of the terminal 200, the terminal 200 can implicitly notify the access point 100 of the reception quality of its own.

Figure 7:
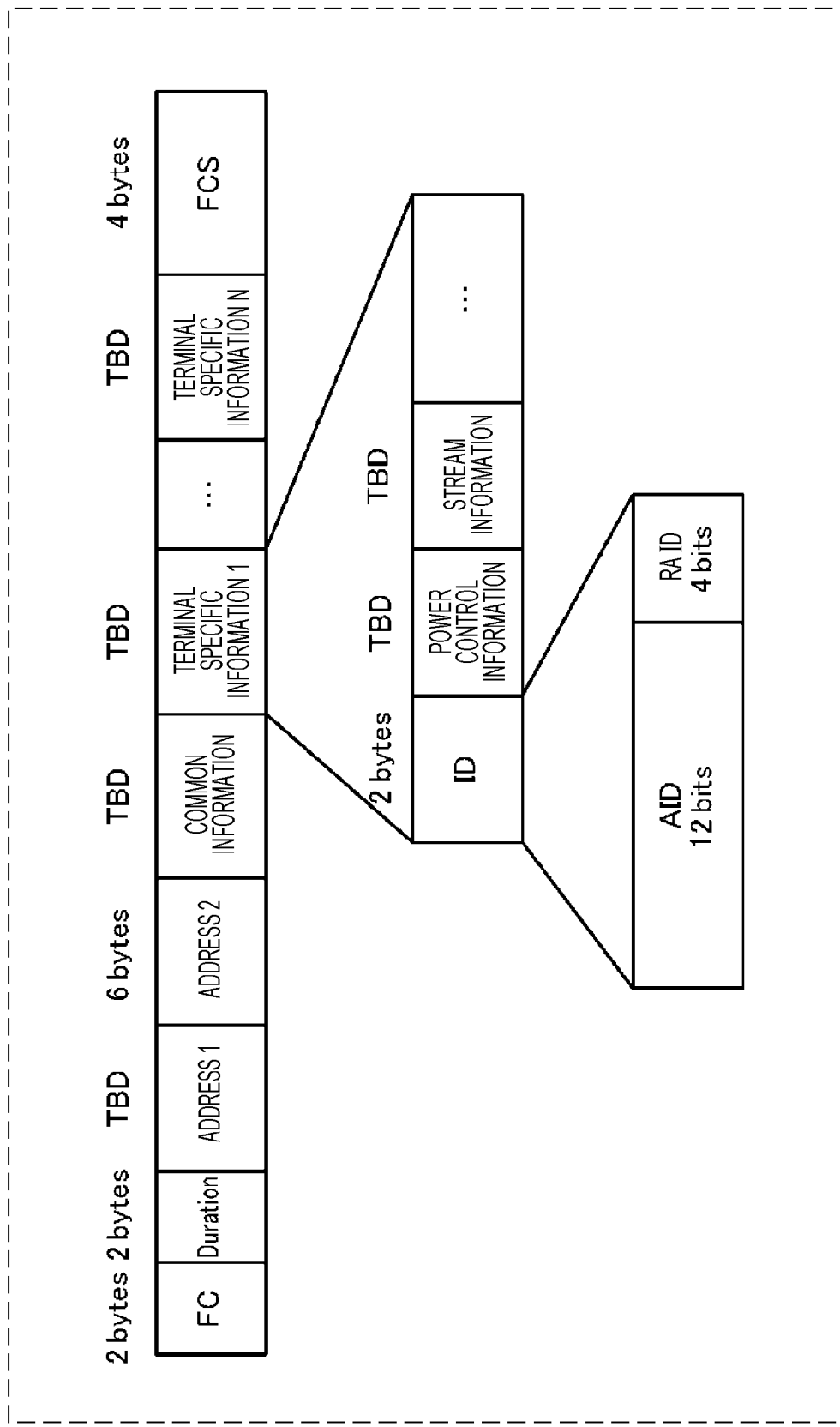
FIG. 7 illustrates an example of a transmission format of the TF-R.

A method for setting the RA ID is described with reference to an example of the TF-R format illustrated in FIG. 7.

The TF-R includes terminal common information ("common information") including the allocation pattern of RUs in all frequency resources and information specific for each of the terminals 200 ("terminal specific information (Per User Information)") assigned to each of RUs. A terminal specific information field has a 2-byte ID field, which includes a 12-bit AID subfield.

Here, the values 2008 to 2047 (0 may be further included), which are reserved values for existing 12-bit AID (1 to 2007), may be used for the RA ID. In this manner, if the terminal 200 is notified of a value between 1 to 2007 by the existing 12-bit AID, the terminal 200 can determine that the RU is the scheduled UL data RU. However, if a value between the reserved values 2008 to 2047 (0 may be further included) is notified, the terminal 200 can determine that the RU is a random access RU. Alternatively, as illustrated in the example of FIG. 7, the 12-bit AID subfield and the 4-bit RA ID subfield may be separately arranged. Furthermore, as illustrated in FIG. 7, by arranging the RA ID subfield and the AID subfield adjacent to each other, the terminal 200 can perform a process (make a determination) by using a 16-bit value including a 12-bit AID and a 4-bit RA ID in one go.

Figure 8:
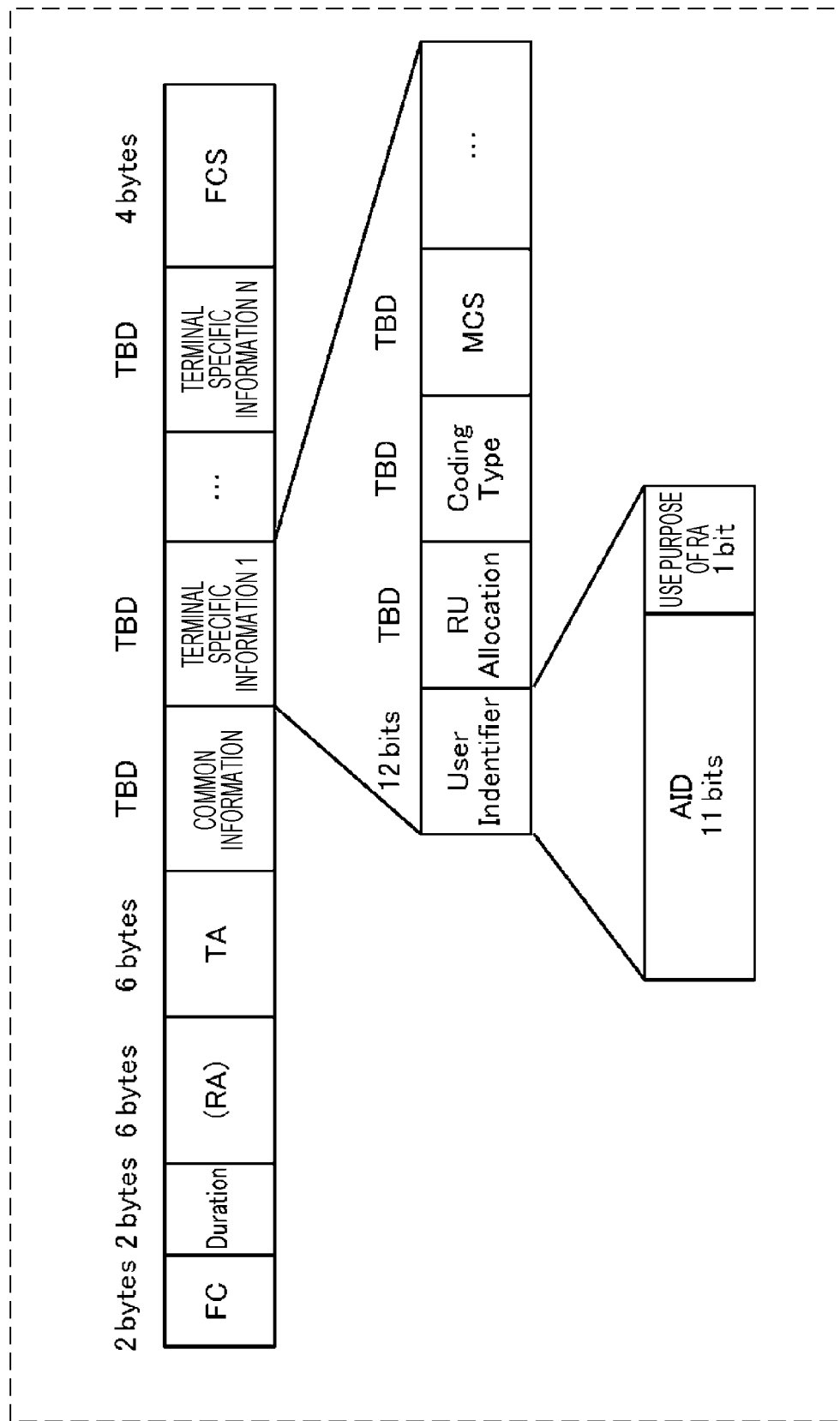
FIG. 8 illustrates another example of the transmission format of the TF-R.

Alternatively, in a method for setting the RA ID, the RA ID may be set as illustrated in an example of a TF-R format in FIG. 8.

The TF-R illustrated in FIG. 8 includes pieces of information each specific for one of the terminals 200 ("terminal specific information") equal in number to the number of allocated RUs. The terminal specific information includes, for example, 12-bit User ID, RU allocation information, and MCS information.

Here, as illustrated in the example of FIG. 8, the 11-bit AID (1 to 2007) and 1-bit RA use purpose information may be separately arranged in the 12 bit User ID field. The 1-bit RA use purpose information may be used in the same manner as in the above-described RA ID table (for example, FIG. 6A). For example, as illustrated in FIG. 9, definition may be made such that the 1-bit RA use purpose information of 0 indicates "the reception quality: high", and the 1-bit RA use purpose information of 1 indicates " the reception quality: low".

The example of the TF-R format illustrated in FIG. 7 and FIG. 8 may be applied to other embodiments described below.

In this manner, according to Setting Method 1, by defining the RA ID table illustrated in FIG. 6A, the reception quality of the terminal 200 can be implicitly notified by using the RA RU used for transmission of the UL response signal. Thus, an increase in overhead of the UL response signal can be reduced. In addition, since the access point 100 can get to know the reception quality of the terminal 200 in addition to the information explicitly indicated by the UL response signal, the access point 100 can efficiently schedule the DL Data/UL Data transmission after the random access is performed and, thus, the system throughput (the system performance) can be increased.

Setting Method 2

Figures 10A, 10B:
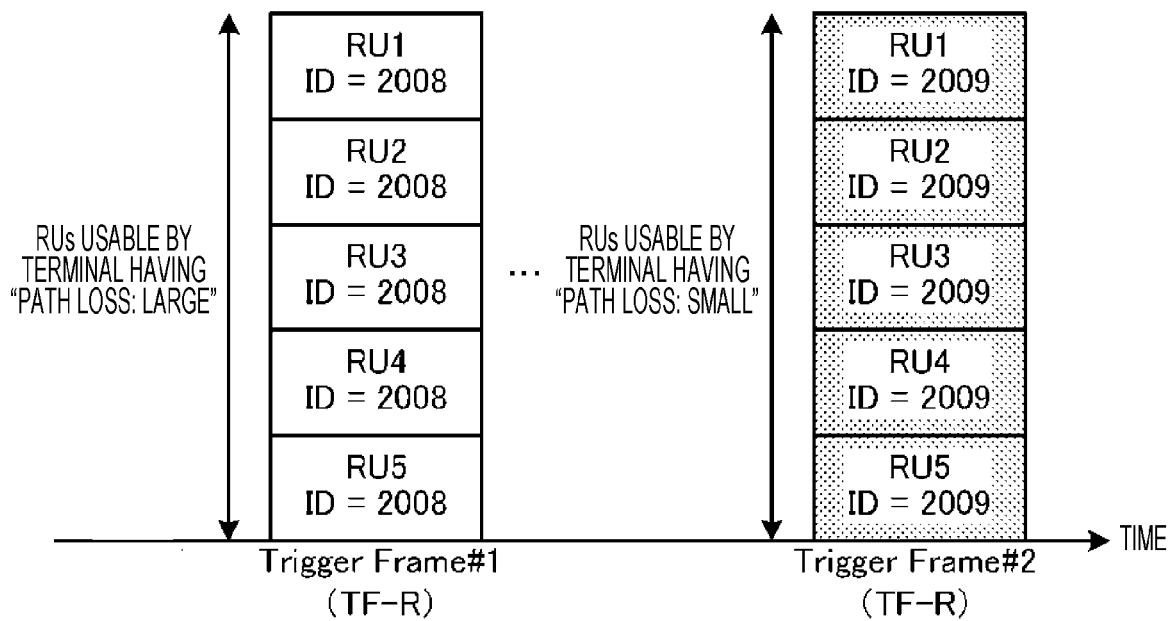
FIG. 10A illustrates an example of an RA ID table according to Setting Method 2 of the first embodiment.
FIG. 10B illustrates an example of a TF-R according to Setting Method 2 of the first embodiment.

An RA ID table is described in Setting Method 2 in which the path loss of a terminal 200 that performs random access and a RA ID are uniquely associated with each other. FIG. 10A illustrates an example of the RA ID table according to Setting Method 2. FIG. 10B illustrates an example of a TF-R including the RA control signal to be notified to the terminal 200 by the access point 100 according to Setting Method 2.

In the RA ID table illustrated in FIG. 10A, an RA ID=2008 is associated with a path loss that is large (for example, 70 dB or higher), and an RA ID=2009 is associated with a path loss that is small (for example, lower than 70 dB).

In the example illustrated in FIG. 10B, RU 1 to RU 5 are set as RA RUs in the allocation information of RUs included in the RA control signal of each of TF-Rs. In addition, in FIG. 10B, an RA ID=2008 is assigned to each of RU 1 to RU 5 for a certain time frame (Trigger Frame #1), and an RA ID=2009 is assigned to each of RU 1 to RU 5 for another time frame (Trigger Frame #2). In other words, in FIG. 10B, RU 1 to RU 5 for Trigger Frame #1 are RUs that are usable by a terminal 200 having a large path loss, and RU 1 to RU 5 for Trigger Frame #2 are RUs that are usable by a terminal 200 with a small path loss.

For example, the terminal 200 with a large path loss refers to the RA ID table illustrated in FIG. 10A and identifies an RA ID=2008 corresponding to the path loss of the terminal 200 itself. Thereafter, the terminal 200 determines that among the TF-Rs illustrated in FIG. 10B, RU 1 to RU 5 for Trigger Frame #1 corresponding to an RA ID=2008 are available RA RUs. Subsequently, the terminal 200 randomly selects one of the available RU 1 to RU 5 for Trigger Frame #1 and transmits the UL response signal by using the selected RU.

In addition, the access point 100 identifies an RA ID (in this case, 2008) corresponding to the TF-R that the terminal 200 synchronizes (in this case, Trigger Frame #1) on the basis of the reception timing of the UL response signal transmitted by the terminal 200 (the path loss: high). Thereafter, the access point 100 refers to the RA ID table illustrated in FIG. 10A and determines that the path loss ("large") corresponding to the identified RA ID=2008 is the path loss of the terminal 200. Thereafter, the access point 100 performs scheduling (e.g., transmission power control) of the terminal 200 by using the acquired reception quality of the terminal 200 and the transmission information indicated by the UL response signal.

Note that, transmission and reception of a UL response signal are performed by the terminal 200 with a small path loss in the same manner as described above.

That is, by selecting the RA RU of the time frame to be used for transmission of the UL response signal in accordance with the path loss of the terminal 200, the terminal 200 can implicitly notifies the access point 100 of the path loss of the terminal 200 itself.

In this manner, according to Setting Method 2, by defining the RA ID table illustrated in FIG. 10A and by using the RA RU used for transmission of the UL response signal, the path loss of the terminal 200 can be implicitly notified. As a result, the accuracy of the transmission power control of the DL Data/UL Data after the random access is performed can be increased while reducing an increase in the overhead of the UL response signal.

In addition, according to Setting Method 2, as illustrated in FIG. 10B, the terminals 200 having similar path loss levels are allowed to perform random access at the same time. For example, in the case where the transmission power of the terminal 200 is fixed, if the terminals 200 having similar path loss levels perform random access at the same time, the reception power of the UL response signal transmitted from each of the terminals 200 through one of the RUs at the access point 100 is substantially the same. Thus, a decrease in performance caused by AGC (Adaptive Gain Control) at the access point 100 can be prevented.

Note that to prevent a decrease in performance caused by AGC in uplink OFDMA, uplink transmission power control performed by the terminal 200 to maintain the reception power density in the access point 100 constant is important. Accordingly, when the terminal 200 performs the transmission power control, the access point 100 may set the target reception power (or an index instead of the target reception power, such as the target reception power density) in the TF-R. For example, the target reception power may be notified by using the terminal specific information field for each of the RU allocations in the TF-R (refer to FIG. 7). At this time, in the RA ID table, an RA ID and a path loss level are uniquely associated with each other, as illustrated in FIG. 10A. In addition, since Closed-loop transmission power control is not usable in random access, the terminal 200 may not be able to perform transmission with the transmission power that satisfies the target reception power set by the access point 100. For example, there is a case where the received power does not reach the target received power even when the terminal 200 having a large path loss performs transmission with the maximum transmission power.

Accordingly, random access transmission performed by a terminal 200 that cannot satisfy the target reception power may be inhibited.

In this manner, by defining the RA ID table illustrated in FIG. 10A and sending the target reception power by using TF-R, a decrease in AGC performance of the access point 100 in random access reception can be prevented when the terminal 200 performs transmission power control. In addition, by selecting the resource (e.g., the time frame) usable by each of the terminals 200 in accordance with the path loss level, the terminals 200 that can support the predetermined target reception power can be selected.

Setting Method 3

Figures 11A, 11B:
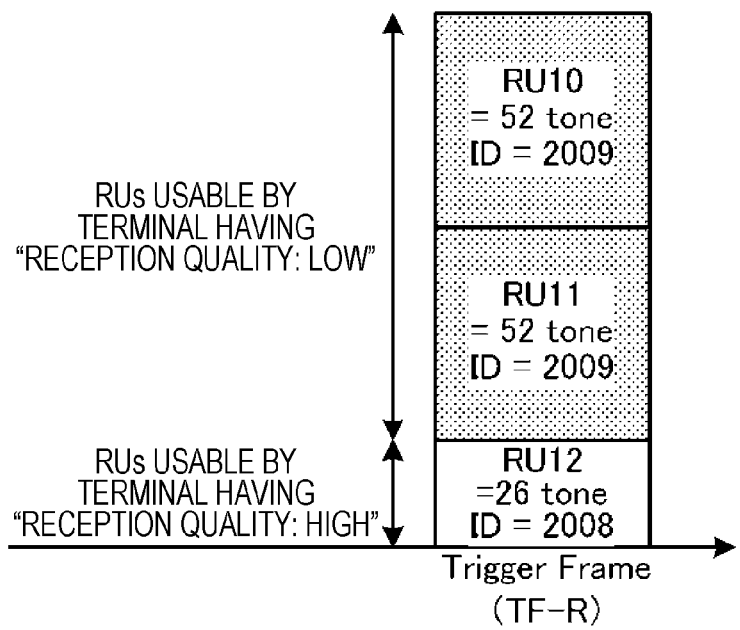
FIG. 11A illustrates an example of an RA ID table according to Setting Method 3 of the first embodiment.
FIG. 11B illustrates an example of a TF-R according to Setting Method 3 of the first embodiment.

An RA ID table is described in Setting Method 3 in which a pair consisting of the reception quality of the random access terminal 200 and the MCS for modulating the UL response signal and the RA ID are uniquely associated with each other. FIG. 11A illustrates an example of the RA ID table according to Setting Method 3. FIG. 11B illustrates an example of TF-R including an RA control signal sent from the access point 100 to the terminal 200.

In addition, in FIG. 11A, it is assumed that RUs with different bandwidths (tone numbers) are set as RA RUs.

In the RA ID table illustrated in FIG. 11A, an RA ID=2008 is associated with high reception quality (for example, SNR is 10 dB or higher) and a high rate MCS (QPSK, Coding rate=1/2), and an RA ID=2009 is associated with low reception quality (for example, the SNR is lower than 10 dB) and a low rate MCS (BPSK, Coding rate=1/2).

In the example illustrated in FIG. 11B, RU 10 to RU 12 are set as RA RUs in the allocation information for RUs included in the RA control signal. The number of tones of each of RU 10 to RU 11 is 52 tones, and the number of tones of RU 12 is 26 tones, and the bandwidths of the RUs are different. In FIG. 11B, an RA ID=2009 is allocated to the RU 10 to RU 11 having a large bandwidth, and an RA ID=2008 is allocated to the RU 12 having a narrow bandwidth. In other words, in FIG. 11B, the RUs 10 to 11 having a wide bandwidth are RUs that are usable by the terminals 200 with a low reception quality, and the RU 12 having a narrow bandwidth is an RU that is usable by a terminal 200 with a high reception quality.

For example, the terminal 200 having a low reception quality refers to the RA ID table illustrated in FIG. 11A to identify an RA ID=2009 and the low rate MCS corresponding to the reception quality of the terminal 200 and determines that among RU 10 to RU 12 notified by TF-R illustrated in FIG. 11B, RU 10 to RU 11 corresponding to an RA ID=2009 are usable RA RUs. Thereafter, the terminal 200 randomly selects one of the usable RU 10 to RU 11 and transmits a UL response signal modulated with a low rate MCS (BPSK, Coding rate=1/2) by using the selected RU.

In addition, upon receiving the UL response signal transmitted by the terminal 200 (the reception quality: low), the access point 100 identifies the RA ID (in this case, 2009) corresponding to the RU (the reception RU) by which the UL response signal was received among the RU 10 to RU 12 illustrated in FIG. 11B. Thereafter, the access point 100 refers to the RA ID table illustrated in FIG. 11A and determines that the reception quality ("low") corresponding to the identified RA ID=2009 is the reception quality of the terminal 200. Subsequently, the access point 100 performs scheduling for the terminal 200 by using the acquired reception quality of the terminal 200 and the transmission information indicated by the UL response signal.

Note that, transmission and reception of a UL response signal are performed for a terminal 200 having a high reception quality in the same manner as described above.

In this manner, according to Setting Method 3, by defining the RA ID table illustrated in FIG. 11A, the reception quality of the terminal 200 can be implicitly notified by the RA RU used for transmission of the UL response signal. As a result, the system throughput (the system performance) can be increased while preventing an increase in overhead of the UL response signal.

In addition, according to Setting Method 3, the terminal 200 can transmit the UL response signal through random access by using the bandwidth and the MCS corresponding to the reception quality of the terminal 200. For example, when the transmission power of the terminal 200 is fixed, the terminal 200 can generate a UL response signal by using an appropriate MCS. Consequently, the time length of the UL response signal can be reduced, and the overhead can be reduced.

In FIG. 11A, the case where the reception quality (high/low) is associated with the RA ID is illustrated. However, instead of the reception quality, the path loss (large/small) may be associated with the RA ID, as in Setting Method 2. Even in such a case, the same effect can be obtained.

The Setting Methods 1 to 3 of the RA ID table have been described above.

As described above, according to the present embodiment, the access point 100 transmits, to the terminal 200, an RA control signal indicating the RA RU to which one of a plurality of RA IDs associated with the communication state of the terminal 200 is assigned. Thereafter, the terminal 200 selects one of the usable RA RUs in accordance with the actual communication state of the terminal 200 and performs random access by using the selected RA RU. As a result, the access point 100 can get to know the communication state of the terminal 200 in accordance with the RA RU used by the terminal 200 for random access. That is, since the terminal 200 need not explicitly notify the access point 100 of the communication state of the terminal 200, the overhead of the control signal in random access can be reduced. As a result, the access point 100 can increase the amount of information notified by the control signal while reducing the overhead of the control signal transmitted through random access. Thus, the system throughput can be increased.

For example, according to an existing frame, the DL Data request signal (PS-Poll, which is described in detail below) transmitted from a terminal in a power saving mode does not notify the terminal quality information. For this reason, the access point cannot accurately perform MCS control of DL Data after random access is performed. In contrast, according to the present embodiment, the PS-Poll transmitted by the terminal 200 in a power saving mode can give notification of the communication state of the terminal 200 by using the RA RU for transmission. As a result, by using PS-Poll, the access point 100 can accurately perform MCS control of DL Data after random access is performed.

Note that the communication state of a terminal associated with an RA ID in the RA ID table is not limited to the reception quality (the SNR) and the path loss. Any parameter used for scheduling performed by the access point 100, for example, can be used as the communication state. For example, the communication state is one of the uplink transmission buffer amount, path loss, reception quality, RSSI, and interference power.

Second Embodiment

As described above, in the random access, there are a plurality of types and use purposes of a UL response signal to be transmitted (hereinafter referred to as "RA types"). That is, the RA type indicates a variety use purposes of random access.

Examples of the RA type include random access used to give notification of the transmission buffer information and random access used for transmission performed when a terminal returns from the power saving mode to the normal mode.

The transmission buffer information includes the presence/absence of data stored in the transmission buffer of the terminal and the amount of data (also referred to as a "buffer amount" or a "queue size").

In addition, the UL response signal transmitted by the terminal in a power saving mode through random access includes information for requesting the access point to transmit the DL Data generated during the power saving mode. More specifically, the terminal returns from the power saving mode to a normal mode at the transmission time of a TF-R indicated by the beacon. Thereafter, the terminal that has returned from the power saving mode randomly selects one of the RA RUs indicated by the TF-R. Subsequently, by using the selected RU, the terminal transmits, to the access point, a UL response signal for requesting the DL Data generated and destined for the terminal itself during the power saving mode. This UL response signal is referred to as "PS-Poll". According to the existing Frame format, PS-Poll is a signal for transmitting only the MAC Header for identifying a terminal. By using such random access, the terminal can save power.

Depending on the use purpose (the type) of random access described above, the amount of transmission information and the importance level vary. Thus, if collision of random access having a large amount of transmission information or collision of random access having a high importance level occurs and, thus, reception at the access point is not successful, the influence on system throughput is greater.

For example, the amount of transmitted information in the random access for notifying the transmission buffer information is larger than that in the random access performed by a terminal in the power saving mode to request DL Data. In addition, the importance level of the random access for transmission buffer information notification sent by a terminal, which operates in a normal mode and has data in the transmission buffer, is higher than that of the random access for a request of DL Data transmitted by a terminal operating in the power saving mode (the influence on system performance is greater). Note that the difference in importance level includes data with different priority levels of terminals.

Accordingly, in the present embodiment, a method capable of reducing the collision rate of random access having a large amount of transmission information or random access having a high importance level and improving the system performance is described.

Figure 12:
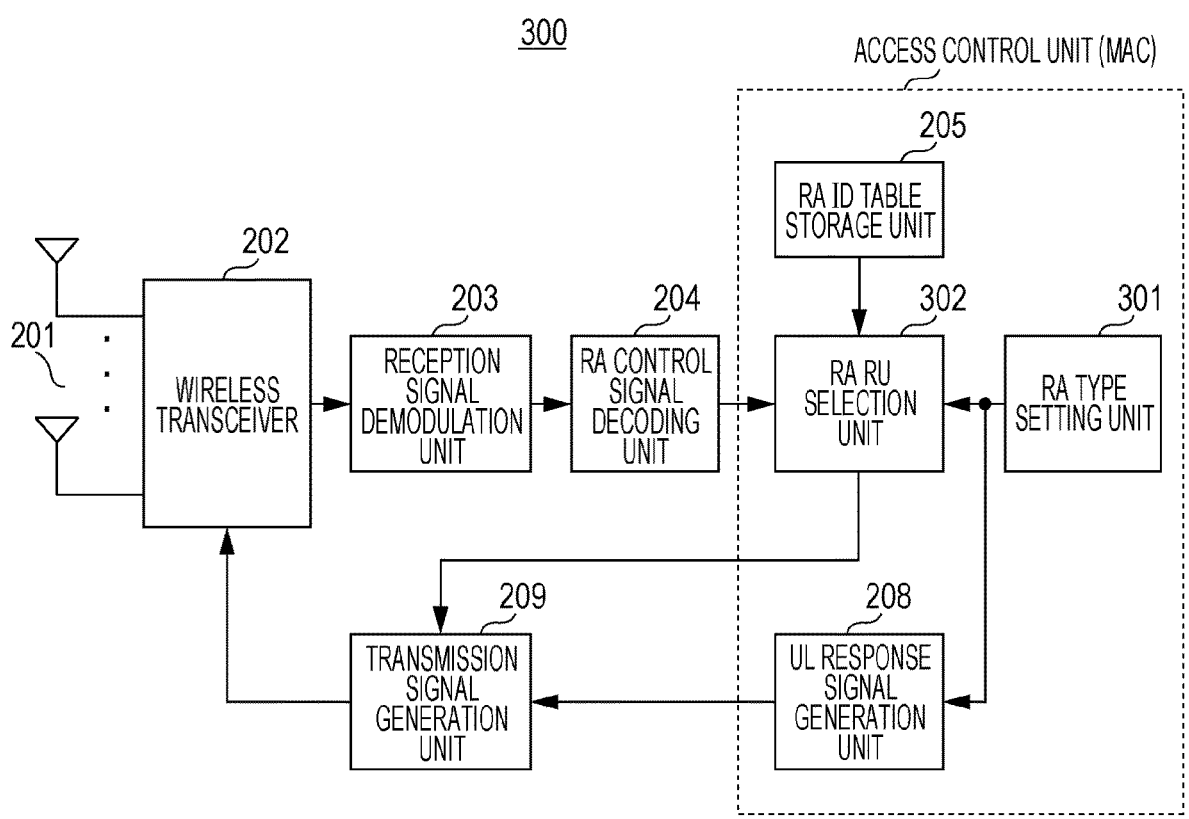
FIG. 12 is a block diagram illustrating the configuration of a terminal according to a second embodiment.

FIG. 12 is a block diagram illustrating the configuration of a terminal 300 according to the present embodiment. Unlike FIG. 5, according to the configuration of FIG. 12, the information to be input to an RA RU selection unit 302 is set by an RA type setting unit 301 in FIG. 12. The configuration of an access point 100 is the same as that of the first embodiment (FIG. 4). However, according to the present embodiment, an RA ID table stored in the RA ID table storage units 101 and 205 differs from that of the first embodiment (the RA ID table is described in more detail below).

In the RA ID table stored in the RA ID table storage units 101 and 205, a plurality of RA types having different importance levels or different amount of transmission information and a plurality of RA IDs are uniquely associated with each other.

In FIG. 12, the RA type setting unit 301 sets the type and use purpose (RA type) of a UL response signal to be transmitted through random access.

As available RUs, the RA RU selection unit 302 identifies, from among a plurality of RUs indicated by the allocation information input from the RA control signal decoding unit 204, the ones each having an ID assigned thereto that is the same as the RA ID associated with the RA type of the terminal including the RA RU selection unit 302 on the basis of the RA ID table stored in the RA ID table storage unit 205 and the RA type input from the RA type setting unit 301. Thereafter, the RA RU selection unit 302 randomly selects one of the identified RUs.

The UL response signal generation unit 208 generates a UL response signal including the terminal ID of the terminal 300 and the transmission information (e.g., transmission buffer information or a DL Data request) of the terminal 300 in accordance with the RA type input from the RA type setting unit 301.

Setting Method of RA ID Table

A setting method of the RA ID table held by the access point 100 and the terminal 300 is described in detail below.

Hereinafter, Setting Methods 4 to 6 of the RA ID table are described.

Setting Method 4

Figures 13A, 13B:
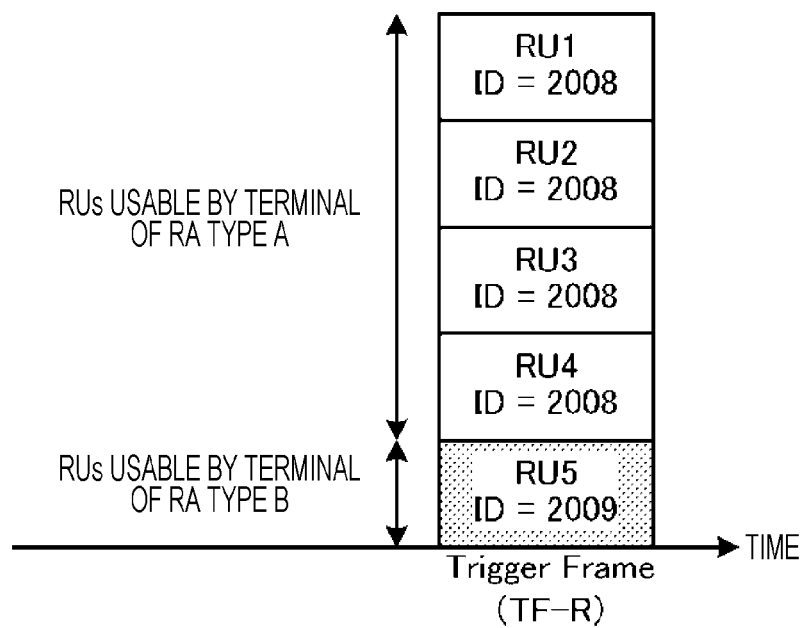
FIG. 13A illustrates an example of an RA ID table according to Setting Method 4 of the second embodiment.
FIG. 13B illustrates an example of a TF-R according to Setting Method 4 of the second embodiment.
Figure 13C:
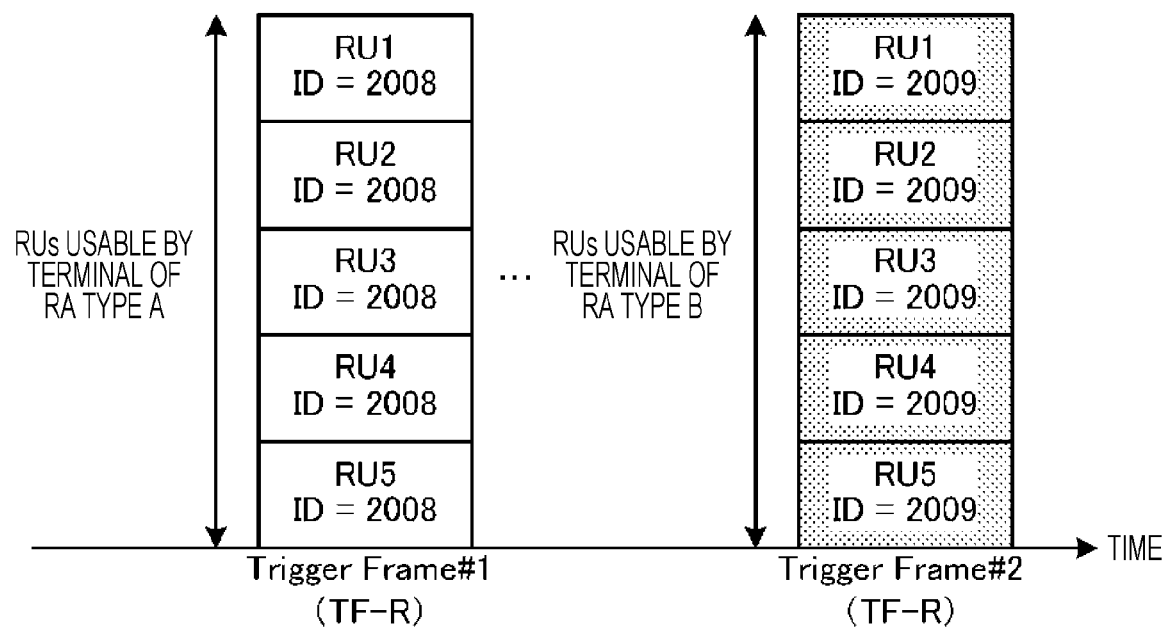
FIG. 13C illustrates another example of the TF-R according to Setting Method 4 of the second embodiment.

An RA ID table is described in Setting Method 4 in which the RA type of the terminal 300 that perform random access and an RA ID are uniquely associated with each other. FIG. 13A illustrates an example of the RA ID table according to Setting Method 4. FIGS. 13B and 13C illustrate an example of a TF-R including an RA control signal to be notified to the terminal 300 by the access point 100 according to Setting Method 4.

The RA type A illustrated in FIG. 13A represents random access for giving notification of the transmission buffer information, and the RA type B represents random access for requesting a DL Data. The RA type A used by a terminal having data in the transmission buffer to give notification of the transmission buffer information has a greater influence on the system performance than the RA type B used by a terminal in the power saving mode to perform transmission. Accordingly, the RA type A has a higher importance level. In addition, the RA type A has a larger amount of information transmitted by using the UL response signal than the RA type B.

In the RA ID table illustrated in FIG. 13A, an RA ID=2008 is associated with the random access of RA type A (the importance level: high (or information amount: large)), and an RA ID=2009 is associated with the random access of RA type B (the importance level: low (or information amount: small)).

In an example illustrated in FIG. 13B, as RA RUs, RU 1 to RU 5 are set in the allocation information for RUs included in the RA control signal. In addition, in FIG. 13B, an RA ID=2008 is assigned to each of RU 1 to RU 4, and RA=2009 is assigned to RU 5. Furthermore, as illustrated in FIG. 13B, the number of RUs set for the RA type A, which has a high importance level, is greater than the number of RUs set for the RA type B. For example, in FIG. 13B, RU 1 to RU 4 are RUs usable by a terminal 300 of RA type A, and RU 5 is an RU usable by a terminal 300 of RA type B.

For example, the terminal 300 that transmits a UL response signal of RA type A refers to the RA ID table illustrated in FIG. 13A and identifies an RA ID=2008 corresponding to the RA type A set for the terminal 300 itself. Thus, the terminal 300 determines that among RU 1 to RU 5 notified by using TF-R illustrated in FIG. 13B, RU 1 to RU 4 each corresponding to an RA ID=2008 are available RA RUs. Thereafter, the terminal 300 randomly selects one of the available RU 1 to RU 4 and transmits the UL response signal by using the selected RU.

In contrast, the terminal 300 that transmits a UL response signal of the RA type B refers to the RA ID table illustrated in FIG. 13A and identifies an RA ID=2009 corresponding to the RA type B set for the terminal 300 itself. Thus, the terminal 300 determines that among RU 1 to RU 5 notified by using TF-R illustrated in FIG. 13B, RU 5 corresponding to an RA ID=2009 is an available RA RU. Thereafter, the terminal 300 transmits the UL response signal by using the usable RU 5.

As described above, in FIG. 13B, the number of available RA RUs varies in accordance with the amount of transmission information or the importance level of each of the RA types. More specifically, the number of available RUs to be set increases with increasing amount of transmission information or importance level. In this manner, the collision rate of random access having a large amount of transmission information or a high importance level can be reduced. As a result, the influence of collision of random access on the system performance can be reduced.

Another example of the TF-R according to Setting Method 4 is described below.

In an example illustrated in FIG. 13C, as RA RUs, RU 1 to RU 5 are set in the allocation information for RUs included in the RA control signal of each of TF-Rs. In addition, in FIG. 13C, an RA ID=2008 is assigned to each of RU 1 to RU 5 for a certain time frame (Trigger Frame #1), and an RA ID=2009 is assigned to each of RU 1 to RU 5 for another time frame (Trigger Frame #2).

In FIG. 13C, the terminal 300 randomly selects one from among RU 1 to RU 5 for Trigger Frame #1 or Trigger Frame #2 in accordance with the RA type of the UL response signal to be transmitted and transmits a UL response signal by using the selected RU.

In this manner, in FIG. 13C, the terminals 300 that transmit UL response signals of the same RA type having the same amount of transmission information are allowed to perform random access in the same time frame (in synchronization with the same TF-R). In this manner, as in FIG. 13B, the collision rate of random access having a large amount of transmission information or a high importance level can be reduced. In addition, in each of the time frames, the number of padding bits required to make the frame lengths of the UL response signals of a plurality of terminals 300 the same can be reduced and, thus, the overhead can be reduced.

Method for Determining Number of RU Allocations to DL Data Request RA

A specific example of a method for determining the number of RUs allocated to the random access for the DL Data request (the number of RU allocations) is described below. The access point can get to know the presence/absence of downlink data regarding a terminal in a power saving mode and the frequency of reception of Beacon in the terminal on the basis of the information such as TIM (Traffic Indication Map) element and Listen Interval. The TIM element is included in a beacon frame transmitted by the access point. The TIM element is notified to the terminal. In addition, Listen Interval is included in an Association Request frame and Reassociation Request frame and is notified to the access point. More specifically, the TIM element contains information regarding downlink data (Bufferable Unit (BU)) which the access point buffers. Furthermore, the Listen Interval includes information regarding the frequency of reception of Beacon in the terminal. In addition, the FC (Frame Control) field includes a Power management field. The access point can get to know that the terminal is in the power saving mode by using the Power management field (refer to, for example, IEEE Std 802.11-2012).

If the terminal determines that there is data destined for itself on the basis of the TIM information, the terminal transmits a DL Data request signal (PS-Poll) to the access point. That is, the maximum number of terminals that transmit the DL Data request signal through random access is indicated by the TIM information. In addition, in some cases, the access point can predict the presence or absence of PS-Poll from a specific terminal with a high degree of accuracy on the basis of the previous DL Data request signal (PS-Poll) and Listen Interval. However, the access point does not always accurately know the reception timing of Beacon in the terminal. Consequently, it is effective to determine the number of RU allocations for PS-Poll through random access on the basis of probabilistic estimation.

A specific method for determining the number of RU allocations for PS-Poll is described below.

The access point 100 assumes that the terminal 300 having downlink data (indicated by the TIM information) transmits PS-Poll with a probability of 1/(Listen Interval) in the beacon interval (BI). The access point 100 can estimate the expected value of the number of PS-Polls in the BI by calculating the number of PS-Polls in the BI for all of the target terminals 300. For example, the access point 100 may allocate the RUs for PS-Poll on the basis of a predetermined relationship (e.g., doubling or rounding up to the nearest decimal point) with the estimated expected value. Alternatively, the access point 100 may calculate the number of RUs for PS-Poll on the basis of, for example, the theoretical dispersion that can be calculated from the number of terminals. If the number of RU allocations becomes smaller than the expected value, collision of the random access increases. However, if the number of RU allocations becomes greater than or equal to several times the expected value, the unused RU increases and, thus, the efficiency decreases. As a result, the number of RU allocations should be set to a value within the range of about one to three times the expected value. In particular, it is desirable that the number of RU allocations be within the range of one to two times the expected value.

Alternatively, the access point 100 may predict the next access BI from the Listen Interval for the terminal 300 that is highly likely to transmit PS-Poll (for example, the terminal 300 that responded to the most recent TF-R) and may allocate the RU with a specified terminal ID (STA_ID) instead of using random access. In this case, the access point 100 can perform the above-described PS-Poll RU allocation for a terminal other than the terminal 300 to which the RU with specified terminal ID is allocated.

As described above, the access point 100 appropriately determines the number of RUs allocated to each of the RA types for a DL Data request on the basis of the buffer information destined for the terminal 300 in a power saving mode and the parameter that defines the cycle at which each of the terminals 300 in the power saving mode receives the beacon. In this manner, the collision rate of random access for a DL Data request can be reduced.

Setting Method 5

In Setting Method 5, an example of the operation of an RA ID table is described in which the RA type of the terminal 300 that performs random access and the RA ID described in Setting Method 4 are uniquely associated with each other. That is, the RA ID table according to Setting Method 5 is the same as the RA ID table according to Setting Method 4 (FIG. 13A). However, the RA ID table is characterized by the operation of the method for allocating an RA ID to an RA RU.

Figure 14:
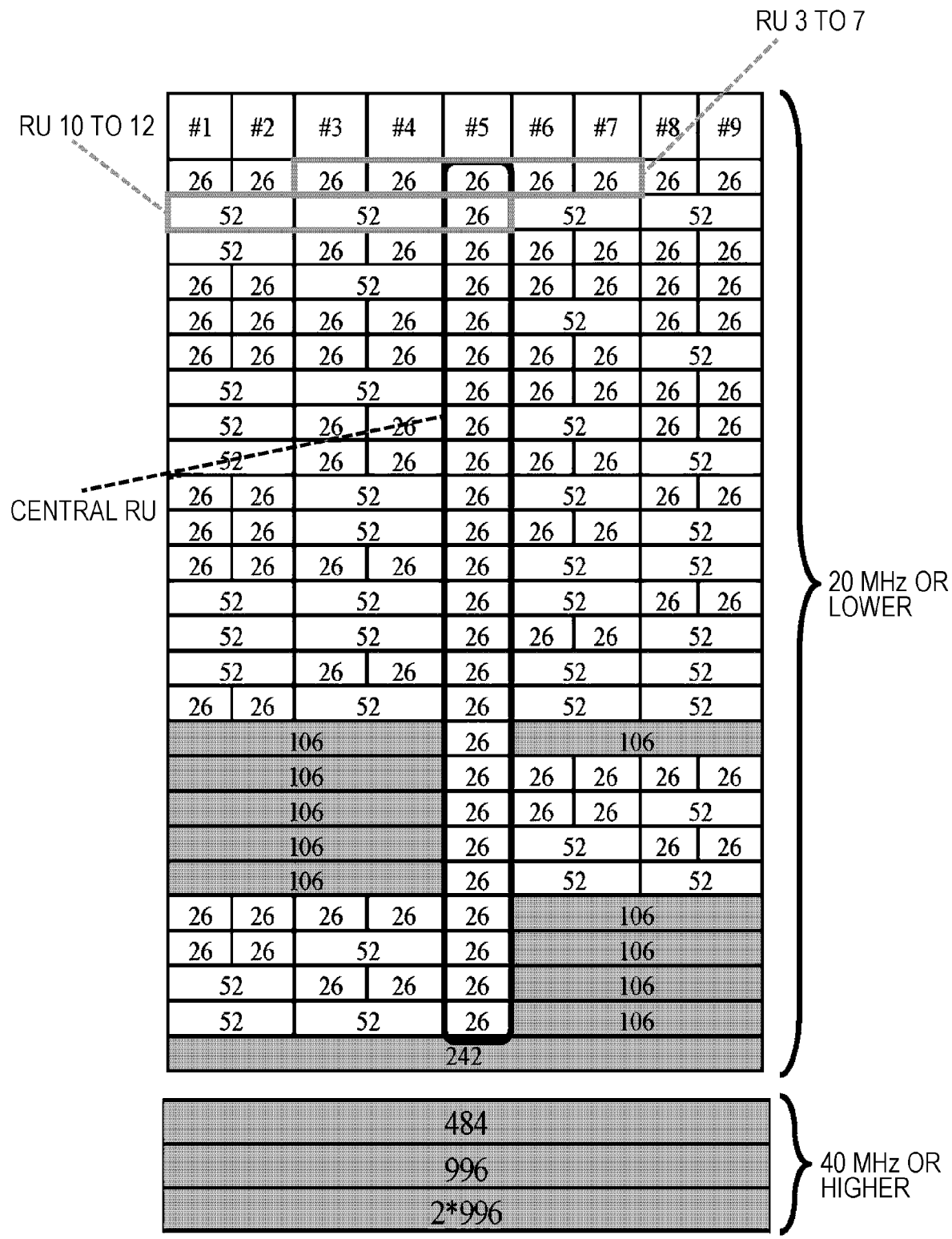
FIG. 14 illustrates an example of an RU allocation pattern being discussed in standardization of 11ax.

FIG. 14 illustrates the RU allocation pattern being discussed in standardization of 11ax (refer to, for example, IEEE 802.11-15/1066r0, "HE-SIG-B Contents"). The numerical values illustrated in FIG. 14 indicate the number of tones that constitute RU #1 to RU #9 (also referred to as the "number of subcarriers"). As illustrated in FIG. 14, in the RU allocation pattern for 20 MHz or less, only the central RU (RU #5 surrounded by a black border in FIG. 14) may be allocated. Here, since the bandwidth of the central RU (26 tones) is the minimum, and the central RU is a resource in the vicinity of the DC subcarrier, the interference is large, so that the reception performance may be lower than that of the other RUs.

Therefore, in Setting Method 5, attention is focused on the above-mentioned problem with respect to the central RU, and UL response signals of an RA type with a low importance level or an RA type with a small amount of transmission information are allocated to the central RU.

More specifically, an RA ID associated with an RA type having a low importance level or a small amount of information is assigned to an RU having a frequency band in the vicinity of the DC subcarrier among the RA RUs notified to the terminal 300. In addition, an RA ID associated with an RA type having a low importance level or a small amount of information is assigned to an RU having a frequency band other than the frequency band in the vicinity of the DC subcarrier.

Figure 15:
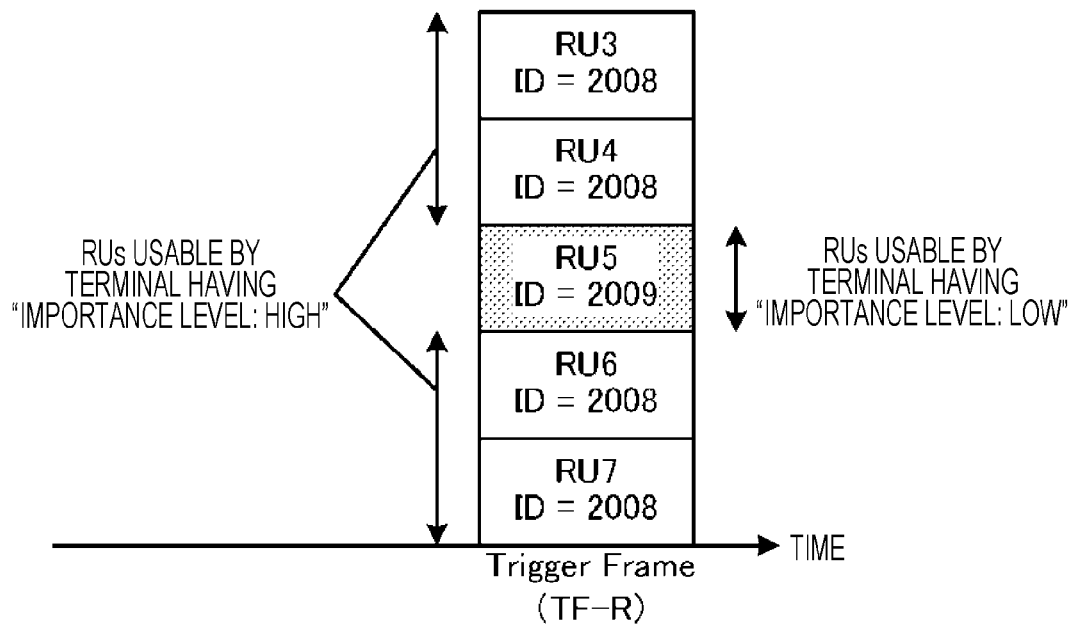
FIG. 15 illustrates an example of a TF-R according to Setting Method 5 of the second embodiment.

FIG. 15 illustrates an example of the TF-R including an RA control signal to be notified to the terminal 300 by the access point 100 according to Setting Method 5. In an example illustrated in FIG. 15, RU 3 to RU 7 are set, as RA RUs, in the allocation information for RUs included in the RA control signal. Similarly, as FIG. 14 illustrates, RU 5 is set as the central RU in FIG. 15.

As illustrated in FIG. 15, an RA ID=2008 is assigned to RUs 3, 4, 6, and 7, which are not the central RU, and an RA ID=2009 is assigned to RU 5 which is the central RU. That is, in FIG. 15, RUs 3, 4, 6, and 7 are RUs usable by the terminal 300 that transmits a UL response signal of the RA type A with a high importance level (or a large amount of transmission information). RU 5 is an RU usable by the terminal 300 that transmits a UL response signal of the RA type A with a low importance level (or a small amount of transmission information).

In FIG. 15, an RU used to transmit a UL response signal of RA type B with a low importance level or a small amount of transmission information is limited to the central RU.

As described above, according to Setting Method 5, the terminal 300 transmits a UL response signal of an RA type with a low importance level or a small amount of transmission information by using the central RU which may cause degradation of the reception performance of the access point 100, while the terminal 300 transmits a UL response signal of an RA type with a high importance level or a large amount of transmission information by using an RU other than the central RU. In this manner, a decrease in the system performance caused by degradation of the reception performance of the random access can be reduced.

Setting Method 6

In Setting Method 6, an example of the operation of the RA ID table is described in which the RA type of the terminal 300 that performs random access and an RA ID described in Setting Method 4 are uniquely associated with each other. That is, the RA ID table according to Setting Method 6 is the same as the RA ID table according to Setting Method 4 (FIG. 13A). However, Setting Method 6 is characterized by the operation of a method for assigning an RA ID to an RA RU.

More specifically, among the RA RUs notified to the terminal 300, an RA ID associated with an RA type with a small amount of transmission information is assigned to an RU having a bandwidth less than or equal to a predetermined value, and an RA ID associated with an RA type with a large amount of transmission information is assigned to an RU having a bandwidth greater than the predetermined value.

Figure 16:
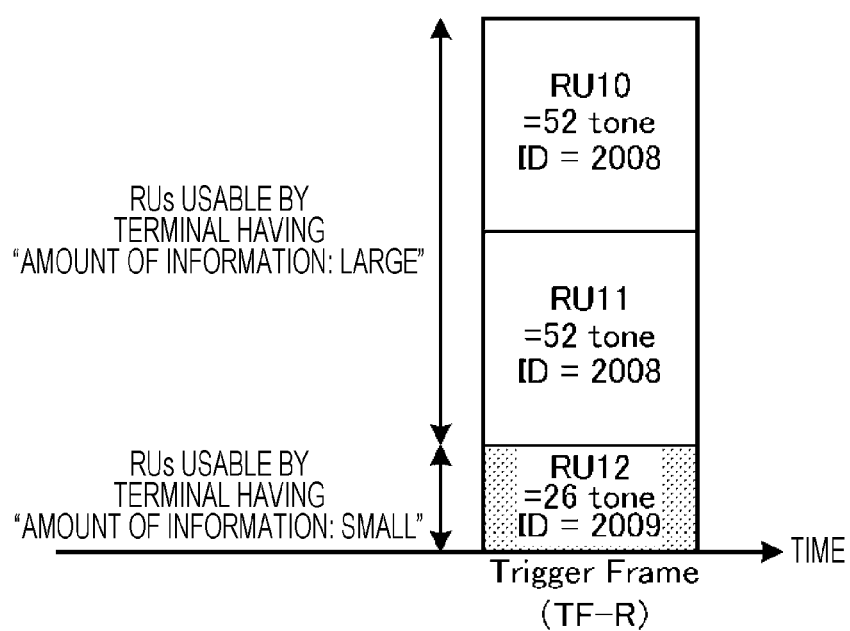
FIG. 16 illustrates an example of a TF-R according to Setting Method 6 of the second embodiment.

FIG. 16 illustrates an example of a TF-R including the RA control signal to be notified to the terminal 300 by the access point 100 according to Setting Method 6. In the example illustrated in FIG. 16, RU 10 to RU 12 are set, as RA RUs, in the allocation information for RUs included in the RA control signal. Note that the number of tones of each of RU 10 to RU 11 is 52, and the number of tones of RU 12 is 26. Thus, the bandwidths of the RUs differ from each other.

As illustrated in FIG. 16, an RA ID=2008 is allocated to the RU 10 to RU 11 having a large bandwidth, and an RA ID=2009 is allocated to the RU 12 having the narrow bandwidth. For example, in FIG. 16, RU 10 to RU 11 are RUs usable by the terminal 300 that transmits a UL response signal of RA type A having a large amount of transmission information, and RU 12 is an RU usable by the terminal 300 that transmits a UL response signal of RA type A having a small amount of transmission information.

As described above, according Setting Method 6, the terminal 300 can generate a UL response signal by using an RU with a bandwidth corresponding to the amount of transmission information. In this manner, in the RUs, the frame lengths of the UL response signals transmitted by the terminals 300 can be made substantially the same and, thus, the padding amount required to make the terminals 300 have the same frame length can be reduced. As a result, the time length of the UL response signal can be reduced and, thus, the overhead can be reduced.

The Setting Methods 4 to 6 of the RA ID table have been described above.

As described above, according to the present embodiment, the access point 100 transmits, to the terminal 300, an RA control signal indicating the RA RUs each having an RA ID assigned thereto. The RA ID is associated with the RA type of the terminal 300. Thereafter, the terminal 300 selects an available RA RU in accordance with the actual RA type of the random access performed by the terminal 300 and performs random access by using the selected RA RU. That is, the RA RUs usable by the terminals 300 vary in accordance with the RA type. Thus, according to the present embodiment, the collision rate of random access with a large amount of transmission information or random access with a high importance level can be reduced and, thus, the system performance can be increased.

Third Embodiment

Figure 17:
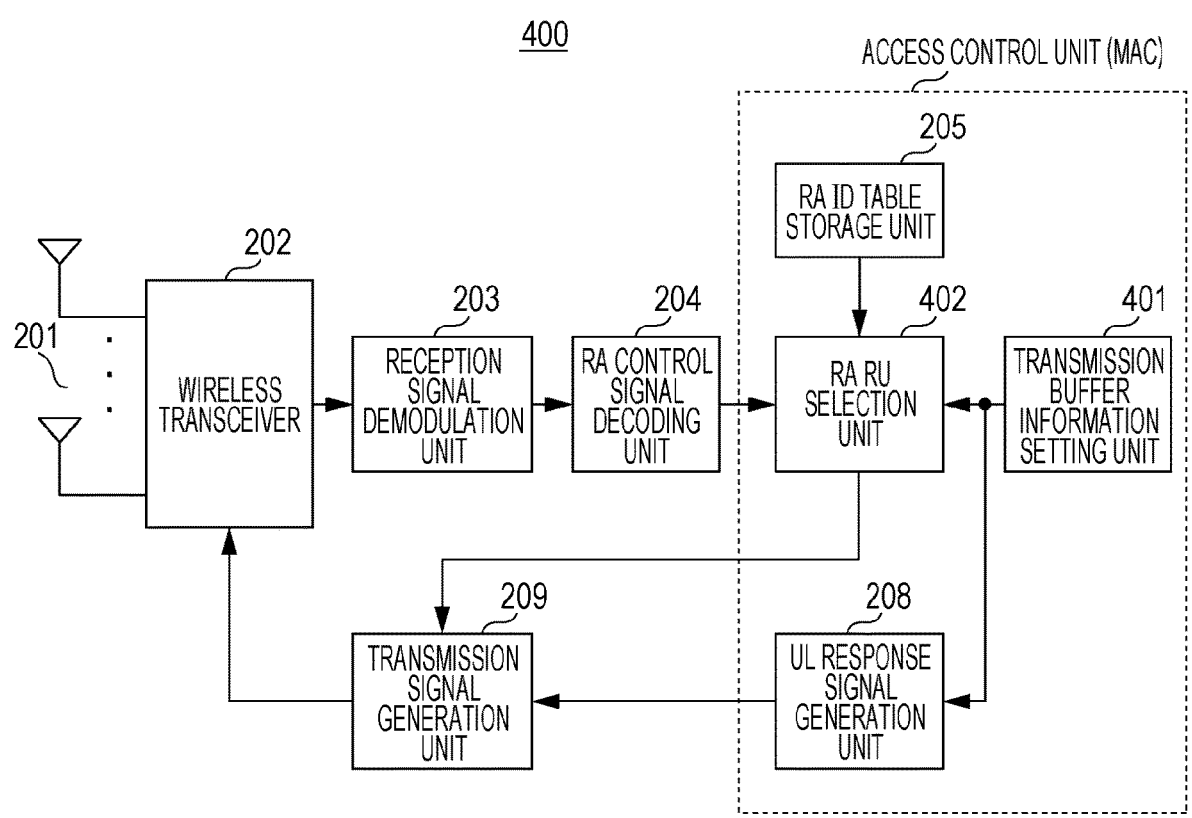
FIG. 17 is a block diagram illustrating the configuration of a terminal according to a third embodiment.

FIG. 17 is a block diagram illustrating the configuration of a terminal 400 according to the present embodiment. According to the configuration of FIG. 17, unlike FIG. 5, the information to be input to an RA RU selection unit 402 is set by a transmission buffer information setting unit 401. The configuration of an access point 100 is the same as that of the first embodiment (FIG. 4). However, according to the present embodiment, the RA ID table stored in the RA ID table storage units 101 and 205 differs from that of the first embodiment (the RA ID table is described in more detail below).

In the RA ID table stored in the RA ID table storage units 101 and 205, random access traffic types (TIDs: Traffic Identifiers) are uniquely associated with a plurality of RA IDs.

In FIG. 17, the transmission buffer information setting unit 401 sets a traffic type of transmission buffer information of random access (e.g., Best effort or Voice). Note that the transmission buffer information is information regarding the presence/absence of data stored in the transmission buffer or the amount of data (also referred to as a "buffer amount" or a "queue size").

As available RUs, the RA RU selection unit 402 identifies, from among a plurality of RUs indicated by the allocation information input from the RA control signal decoding unit 204, the ones each having assigned thereto an ID that is the same as the RA ID associated with the traffic type of the terminal including the RA RU selection unit 402 on the basis of the RA ID table stored in the RA ID table storage unit 205 and the traffic type input from the transmission buffer information setting unit 401. Thereafter, the RA RU selection unit 402 randomly selects one of the identified RUs.

The UL response signal generation unit 208 generates a UL response signal in accordance with the traffic type of the transmission buffer information input from the transmission buffer information setting unit 401.

Setting Method of RA ID Table

A setting method of the RA ID table held by the access point 100 and the terminal 400 is described in detail below.

Setting Method 7

Figure 18:
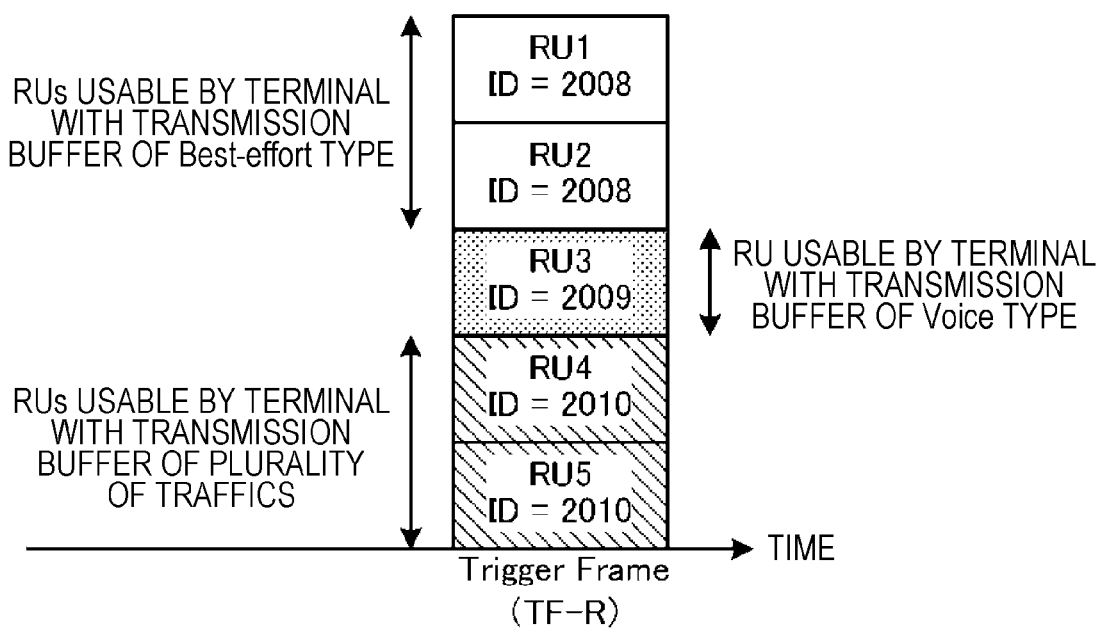
FIG. 18A illustrates an example of an RA ID table according to Setting Method 7 of the third embodiment.
FIG. 18B illustrates an example of a TF-R according to Setting Method 7 of the third embodiment.

According to Setting Method 7, an RA ID table is described in which a traffic type of the transmission buffer information transmitted by the terminal 400 that performs random access and an RA ID are uniquely associated with each other. FIG. 18A illustrates an example of the RA ID table according to Setting Method 7. FIG. 18B illustrates an example of a TF-R including an RA control signal to be notified to the terminal 400 by the access point 100 according to Setting Method 7.

In the RA ID table illustrated in FIG. 18A, an RA ID=2008 is associated with the random access for a terminal having data of "Best effort", an RA ID=2009 is associated with the random access for a terminal having data of "Voice", and an RA ID=2010 is associated with the random access for a terminal having data of a plurality (or all) of traffic types.

In the example illustrated in FIG. 18B, RU 1 to RU 5 are set, as RA RUs, in the allocation information for RUs included in the RA control signal. In addition, in FIG. 18B, an RA ID=2008 is assigned to RU 1 to RU 2, an RA ID=2009 is assigned to RU 3, and an RA ID=2010 is assigned to RU 4 to RU 5. In other words, in FIG. 18B, RU 1 to RU 2 are RUs usable by the terminal 400 having data (the transmission buffer) of "Best effort", RU 3 is an RU usable by the terminal 400 having data (the transmission buffer) of "Voice", and RU 4 to RU 5 are RUs usable by the terminal 400 having data of a plurality (all) of traffic types.

For example, the terminal 400 having data of "Best effort" refers to the RA ID table illustrated in FIG. 18A to identify an RA ID=2008 corresponding to the traffic type of the terminal 400 itself and determines that among RU 1 to RU 5 notified by TF-R illustrated in FIG. 18B, RU 1 to RU 2 corresponding to an RA ID=2008 are usable RA RUs. Thereafter, the terminal 400 randomly selects one of RU 1 to RU 2, which are usable, and transmits a UL response signal by using the selected RU.

In addition, upon receiving the UL response signal transmitted from the terminal 400 (traffic type: Best effort), the access point 100 identifies, among RU 1 to RU 5 illustrated in FIG. 18B, an RA ID corresponding to the RU by which the UL response signal has been received (the reception RU) (in this case, 2008). Thereafter, the access point 100 refers to the RA ID table illustrated in FIG. 18A and determines that the traffic type ("Best effort") corresponding to the identified RA ID=2008 is the traffic type of the terminal 400. Subsequently, the access point 100 performs scheduling for the terminal 400 by using the acquired traffic type of the terminal 400 and the transmission buffer information indicated by the UL response signal.

Note that, transmission and reception of a UL response signal are performed by the terminal 400 having data of another traffic type illustrated in FIG. 18B in the same manner as described above.

That is, the terminal 400 selects an RA RU corresponding to the traffic type of the transmission buffer information transmitted with a UL response signal in accordance with the path loss of the terminal 400. Thus, the terminal 400 can implicitly notify the access point 100 of the traffic type of the terminal 400.

In this way, according to the present embodiment, by defining the RA ID table illustrated in FIG. 18A and by using an RA RU used to transmit the transmission buffer information of the terminal 400 through random access, the traffic type of the transmit buffer information of the terminal 400 can be implicitly notified. As a result, the overhead of the UL response signal can be reduced. Furthermore, in addition to the information clearly indicated by the UL response signal, the access point 100 can get to know the traffic type of the data stored in the transmission buffer by the terminal 400. As a result, the scheduling accuracy of the UL Data after random access is performed increases and, thus, the system performance can be increased.

Fourth Embodiment

According to 11ax, two types of terminal classes (also referred to as "STA Classes") with different required accuracies, such as transmission power setting accuracies or RSSI measurement accuracies, are supported. A terminal of Class A is a high-function terminal, and the setting accuracy of transmission power (the absolute value) is required within±3 dB. That is, a maximum setting error of 3 dB is allowed for a terminal of Class A in terms of the transmission power specified by the access point. In contrast, a terminal of Class B is a low-function terminal, and the setting accuracy of transmission power (the absolute value) is required within±9 dB. That is, a maximum setting error of 9 dB is allowed for a terminal of Class B in terms of the transmission power specified by the access point.

The present embodiment focuses on solving the following problems related to the terminal classes. Existing access points cannot schedule random access transmission of a terminal. Accordingly, if the random access transmission of a terminal of Class A and the random access transmission of a terminal of Class B occur in the same frame, the transmission signals are OFDMA-multiplexed. Thus, the reception performance of the access point may deteriorate. More specifically, when a signal from a terminal with poor transmission power setting accuracy, such as a terminal of Class B, is OFDMA-multiplexed, a large difference in reception power between terminals is likely to occur. The occurrence of a large reception power difference between terminals increases the influence of inter-carrier interference caused by the collapse of orthogonality in OFDMA. In particular, the reception performance for a signal from the terminal with a small reception power greatly deteriorates.

According to the present embodiment, a method capable of preventing degradation of the reception performance even when terminals of different terminal classes are present is described.

Figure 20:
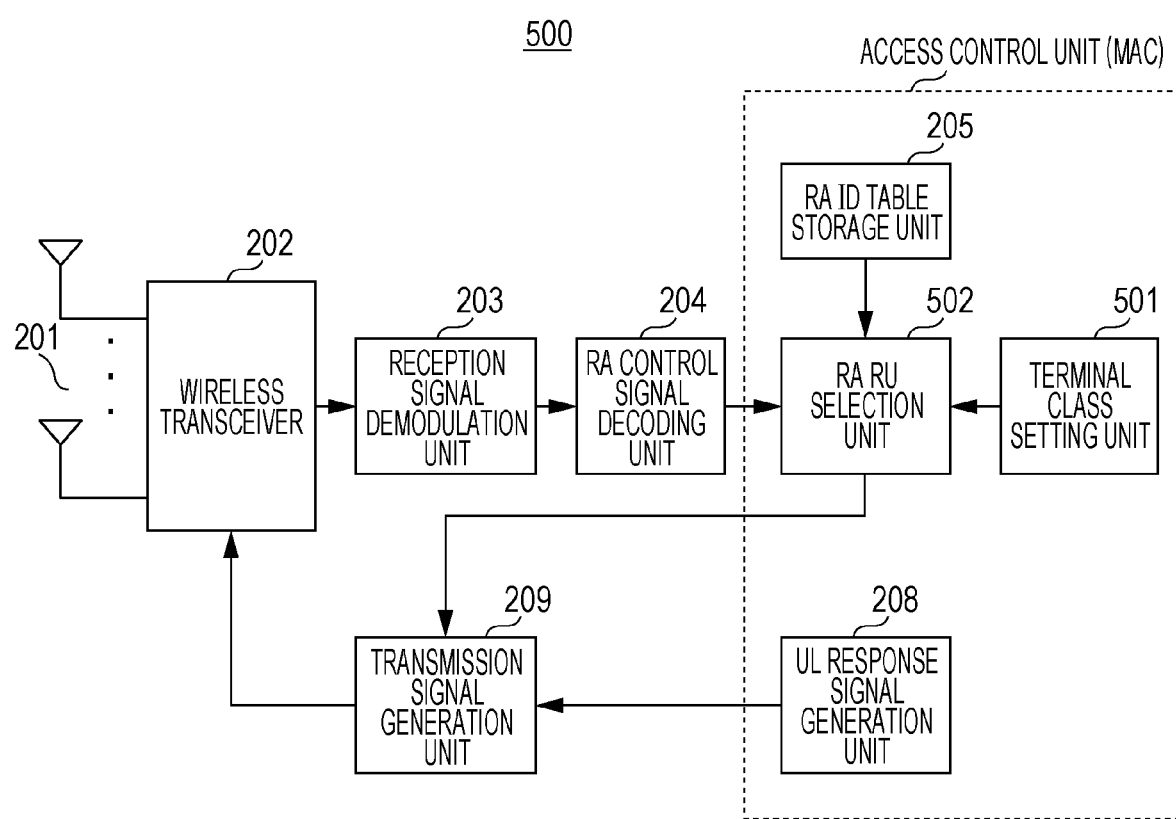
FIG. 20 is a block diagram illustrating the configuration of a terminal according to a fourth embodiment.

FIG. 20 is a block diagram illustrating the configuration of a terminal 500 according to the present embodiment. According to the configuration of FIG. 20, unlike FIG. 5, a terminal class setting unit 501 sets the information to be input to an RA RU selection unit 502. The configuration of an access point 100 is the same as that of the first embodiment (FIG. 4). However, according to the present embodiment, the RA ID table stored in the RA ID table storage units 101 and 205 differs from that of the first embodiment (the RA ID table is described in more detail below).

A terminal class (Class A or Class B) and a plurality of RA IDs are uniquely associated with each other in the RA ID table stored in the RA ID table storage units 101 and 205.

In FIG. 20, the terminal class setting unit 501 sets the terminal class (Class A or Class B) of the terminal that includes the terminal class setting unit 501.

As available RUs, the RA RU selection unit 502 identifies, from among a plurality of RUs indicated by the allocation information input from the RA control signal decoding unit 204, the ones each having assigned thereto an ID that is the same as the RA ID associated with the terminal class of the terminal including the RA RU selection unit 502 on the basis of the RA ID table stored in the RA ID table storage unit 205 and the terminal class input from the terminal class setting unit 501. Thereafter, the RA RU selection unit 502 randomly selects one of the identified RUs.

Setting Method of RA ID Table

A setting method of the RA ID table held by the access point 100 and the terminal 500 is described in detail below.

Setting Method 8

Figures 21A, 21B:
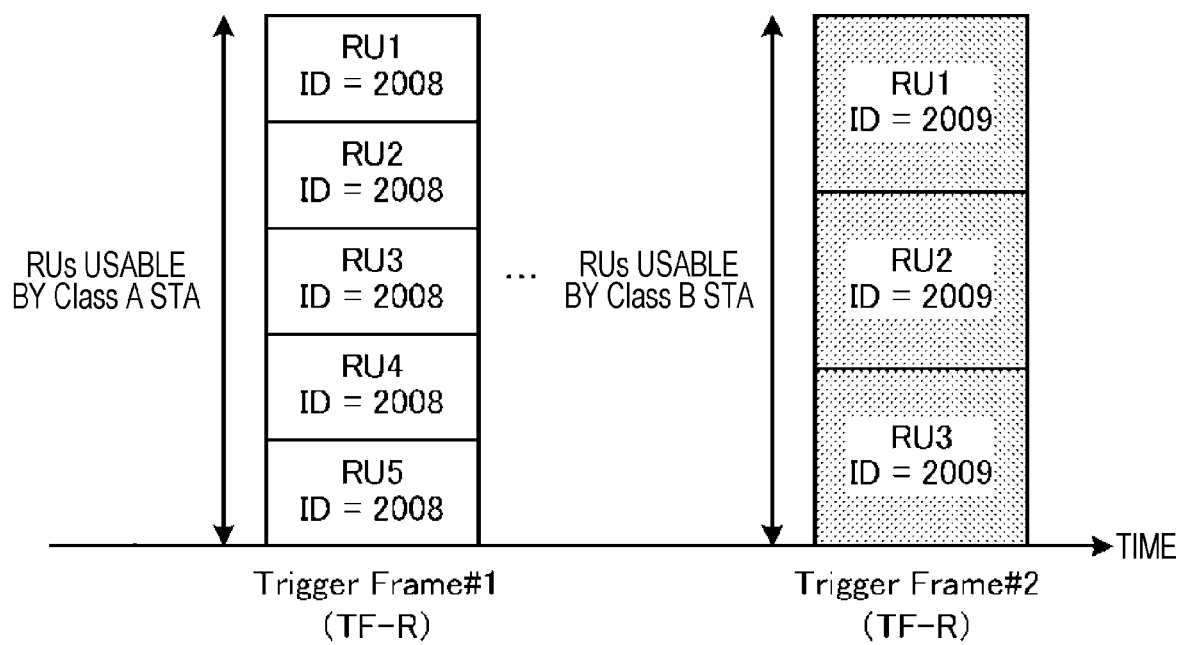
FIG. 21A illustrates an example of an RA ID table according to the fourth embodiment.
FIG. 21B illustrates an example of a TF-R according to Setting Method 8 of the fourth embodiment.

According to Setting Method 8, an RA ID table is described in which the terminal class of the terminal 500 that perform random access and an RA ID are uniquely associated with each other. FIG. 21A illustrates an example of the RA ID table according to Setting Method 8. FIG. 21B illustrates an example of a TF-R including an RA control signal to be notified to the terminal 500 by the access point 100 according to Setting Method 8.

In the RA ID table illustrated in FIG. 21A, an RA ID=2008 is associated with the random access for a terminal of the Class A, and an RA ID=2009 is associated with the random access for a terminal of the Class B.

In the example illustrated in FIG. 21B, as RA RUs, RU 1 to RU 5 are set in allocation information for RUs included in the RA control signal of each of the TF-Rs for a certain time frame (Trigger Frame #1). RU 1 to RU 3 are set for the time frame (Trigger Frame #2). In addition, an RA ID=2008 is assigned to RU 1 to RU 5 of Trigger Frame #1, and an RA ID=2009 is assigned to RU 1 to RU 3 of another time frame (Trigger Frame #2).

In FIG. 21B, the terminal 500 randomly selects one of RU 1 to RU 5 of Trigger Frame #1 or RU 1 to RU 3 of Trigger Frame #2 in accordance with the terminal class of the terminal 500 and transmits a UL response signal by using the selected RU.

In FIG. 21B, for the frame in which terminals of Class A are OFDMA-multiplexed, since the transmission power setting accuracy of all terminals is high, the difference in reception power among the terminals does not increase and, thus, the reception performance of the access point 100 does not deteriorate.

In addition, in FIG. 21B, for a frame in which terminals of Class B are OFDMA-multiplexed, the number of multiplexes (the number of RUs to be set) is decreased (limited) to a value less than the number of multiplexes for a frame in which terminals of Class A are OFDMA-multiplexed. In this manner, the influence of the collapse of orthogonality in OFDMA is reduced and, thus, deterioration of the reception performance of the access point 100 can be reduced. Note that for a frame in which terminals of Class B are OFDMA-multiplexed, an MCS that is more robust (that has a stronger interference tolerance) may be set in addition to limitation on the number of multiplexes.

As described above, in FIG. 21B, by setting the RA IDs in the access point 100, the terminals 500 of the same terminal class are OFDMA-multiplexed in the same time frame, and random access can be performed. In this way, degradation of the reception performance caused by the collapse of orthogonality in OFDMA can be prevented.

That is, according to Setting Method 8, by defining the RA ID table illustrated in FIG. 21A, the access point 100 can schedule the random access of the terminal 500 in different time frames in accordance with the terminal class. As a result, degradation of the reception performance caused by the collapse of orthogonality in OFDMA can be prevented.

Setting Method 9

According to Setting Method 9, an example of the operation of the RA ID table is described in which a terminal class of the terminal 500 that performs random access and an RA ID described in Setting Method 8 are uniquely associated with each other. That is, the RA ID table according to Setting Method 9 is the same as the RA ID table according to Setting Method 8 (FIG. 21A). However, the RA ID table is characterized by the operation of a method for assigning an RA ID to an RA RU.

Figure 21C:
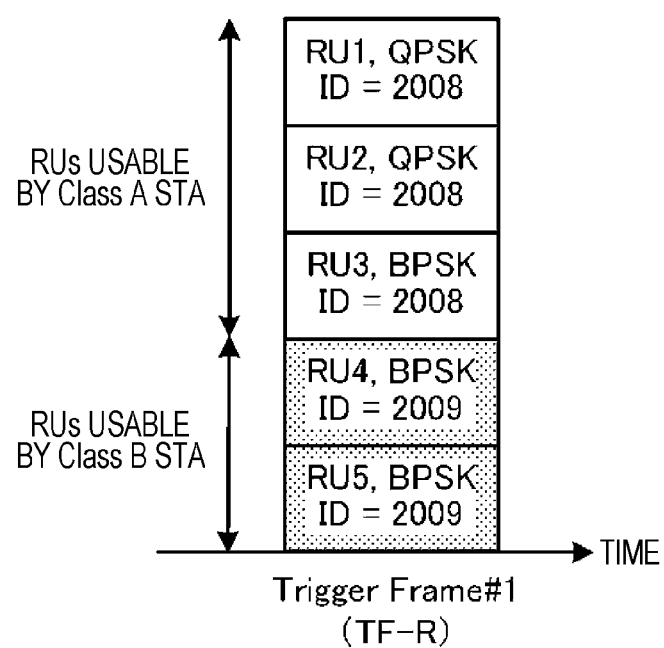
FIG. 21C illustrates another example of the TF-R according to Setting Method 9 of the fourth embodiment.

FIG. 21C illustrates an example of a TF-R including an RA control signal to be notified to the terminal 500 by the access point 100 according to Setting Method 9. In the example illustrated in FIG. 21C, as RA RUs, RU 1 to RU 5 are set in the allocation information for RUs included in the RA control signal of each of TF-Rs. In addition, in FIG. 21C, an RA ID=2008 is assigned to RU 1 to RU 3, and an RA ID=2009 is assigned to RU 4 to RU 5.

Furthermore, as illustrated in FIG. 21C, among the RUs for the terminal of Class A (the RUs having an RA ID=2008 assigned thereto), a robust MCS is applied to the RU that is adjacent to an RU for a terminal of Class B (an RU having an RA ID=2009 assigned thereto), unlike the RU that is not adjacent to an RU for a terminal of Class B. For example, as illustrated in FIG. 21C, among RU 1 to RU 3 for the terminal A of Class A, BPSK is set for RU 3 adjacent to the RU for the terminal of the Class B as a modulation scheme, and QPSK is set for RU 1 and RU 2 that are not adjacent to an RU for a terminal of Class B as a modulation scheme.

Note that among the RUs for a terminal of Class A, an MCS having an MCS index less than or equal to a predetermined threshold may be set for an RU that is adjacent to an RU for a terminal of Class B, and an MCS having an MCS index that is greater than the predetermined threshold may be set for an RU that is not adjacent to an RU for a terminal of Class B. For example, among RUs for a terminal of Class A, an MCS having an MCS index≤2 (the modulation scheme/coding rate: BPSK 1/2, QPSK 1/2, QPSK 3/4) may be set for an RU that is adjacent to an RU for a terminal of Class B, and an MCS having an MCS index>2 (the modulation scheme/coding rate: 16QAM 1/2, 16QAM 3/4, . . . ) may be set for an RU that is not adjacent to an RU for a terminal of Class B.

Alternatively, the modulation method may be fixed. Among the RUs for a terminal of Class A, a coding rate lower than or equal to a predetermined threshold may be set for an RU that is adjacent to an RU for a terminal of class B, and a coding rate higher than the predetermined threshold may be set for an RU that is not adjacent to an RU for a terminal of Class B. For example, among the RUs for a terminal of Class A, an MCS with QPSK/coding rate=1/2 may be set for an RU that is adjacent to an RU for a terminal of Class B, and an MCS with QPSK/coding rate=3/4 may be set for an RU that is not adjacent to an RU for a terminal of Class B.

In FIG. 21C, the terminal 500 randomly selects one of RU 1 to RU 3 or RU 4 to RU 5 in accordance with the terminal class of the terminal 500 and transmits a UL response signal by using the selected RU and MCS.

In this way, in FIG. 21C, the terminals 500 of different terminal classes are OFDMA-multiplexed in the same time frame by the setting of RA ID made by the access point 100, and random access is performed. In addition, in FIG. 21C, among the RUs for a terminal of Class A, a robust MCS is applied to an RU that is adjacent to an RU for a terminal of Class B. Note that in terms of inter-carrier interference caused by collapse of the orthogonality in OFDMA, the interference is more severe as the channels are in closer vicinity. For this reason, by setting a robust MCS for the RU for a terminal of Class A that is adjacent to an RU for a terminal of Class B which is highly likely to produce large interference, deterioration of the reception performance of the access point 100 caused by the collapse of the orthogonality in OFDMA can be reduced even when the terminals 500 of Class A and Class B are OFDMA multiplexed in the same frame.

That is, according to Setting Method 9, by defining the RA ID table illustrated in FIG. 21A, the access point 100 allocates the random access of the terminal 500 to the RU corresponding to the terminal class and allocates a robust MCS to an RU that is highly likely to produce large interference. Thus, deterioration of the reception performance of the access point 100 caused by the collapse of the orthogonality in OFDMA can be prevented.

Setting Method 10

In 11ax, in regard to the transmission power during continuous transmission (also referred to as "Relative Tx power"), it is agreed that "the required accuracy of the transmission power during continuous transmission performed by a terminal of Class B is±3 dB". Note that the transmission power during continuous transmission means the transmission power required when a terminal continuously transmits an uplink MU (Multi-user) transmission signal (corresponding to a UL response signal) within a predetermined time period.

Even for a terminal of Class B, the transmission power setting accuracy can be increased by the access point that performs transmission power control (specifying the relative correction amount with respect to the previous transmission power) on the uplink MU transmission signal of the terminal during continuous transmission. That is, even in Class B indicating a low function, the transmission power setting accuracy of substantially the same level as in Class A indicating a high function is required during continuous transmission.

Accordingly, Setting Method 10 focuses on the above-described transmission power setting accuracy during continuous transmission. According to Setting Method 10, an RA ID is associated while taking into account information as to whether continuous transmission is performed, in addition to the terminal class (Class A or B).

More specifically, according to Setting Method 10, an RA ID table is described in which the transmission power setting accuracy (the required accuracy) required for the terminal 500 that performs random access and an RA ID are uniquely associated with each other. FIG. 22A illustrates an example of the RA ID table according to Setting Method 10. FIG. 22B illustrates an example of a TF-R including an RA control signal to be notified to the terminal 500 by the access point 100 according to Setting Method 10.

In the RA ID table illustrated in FIG. 22A, an RA ID=2008 is associated with the random access for a terminal of Class A and the random access for a terminal of Class B during continuous transmission, and an RA ID=2009 is associated with the random access for a terminal of the other type (Class B during non-continuous transmission). In other words, in the RA ID table illustrated in FIG. 22A, an RA ID=2008 is associated with the random access for a terminal for which a high transmission power setting accuracy (request) is required (±3 dB in FIG. 22A), and an RA ID=2009 is associated with the random access for a terminal for which a low transmission power setting accuracy (request) is required (±9 dB in FIG. 22A).

In the example illustrated in FIG. 22B, as RA RUs, RU 1 to RU 5 are set in allocation information for RUs included in an RA control signal of each of TF-Rs for a certain time frame (Trigger Frame #1), and RU 1 to RU 3 are set for another time frame (Trigger Frame #2). In addition, an RA ID=2008 is assigned to RU 1 to RU 5 for Trigger Frame #1, and an RA ID=2009 is assigned to RU 1 to RU 3 for another time frame (Trigger Frame #2).

In FIG. 22B, the terminal 500 randomly selects one of RU 1 to RU 5 for Trigger Frame #1 or one of RU 1 to RU 3 for Trigger Frame #2 in accordance with the required transmission power accuracy determined depending on the terminal class of the terminal 500 or whether the transmission signal is continuously transmitted or not. Thereafter, the terminal 500 transmits the UL response signal by using the selected RU.

In this manner, in FIG. 22B, for a frame in which the terminals with a high required transmission power setting accuracy perform OFDMA multiplexing, the transmission power setting accuracies of all of the terminals are high. Consequently, a difference in the reception power between the terminals does not increase and, thus, the reception performance of the access point 100 does not deteriorate. In addition, in FIG. 21B, in a frame in which the terminals with a low required transmission power setting accuracy perform OFDMA multiplexing, the number of multiplexes (the number of RUs to be set) is decreased (limited) to a value less than the number of multiplexes for the frame in which the terminals with a high required transmission power setting accuracy perform OFDMA multiplexing. Thus, the influence of the collapse of the orthogonality in OFDMA is reduced, and deterioration of the reception performance of the access point 100 can be reduced. Note that for a frame in which the terminals with a low required transmission power setting accuracy perform OFDMA multiplexing, an MCS that is more robust (an MCS having a stronger interference tolerance) may be set in addition to limiting the number of multiplexes.

As described above, according to Setting Method 10, by defining the RA ID table illustrated in FIG. 22A, the access point 100 can schedule the random access performed by the terminal 500 in accordance with the required transmission power setting accuracy. As a result, like Setting Method 9 and Setting Method 10, deterioration of the reception performance caused by the collapse of the orthogonality in OFDMA can be prevented.

Fifth Embodiment

Figure 24:
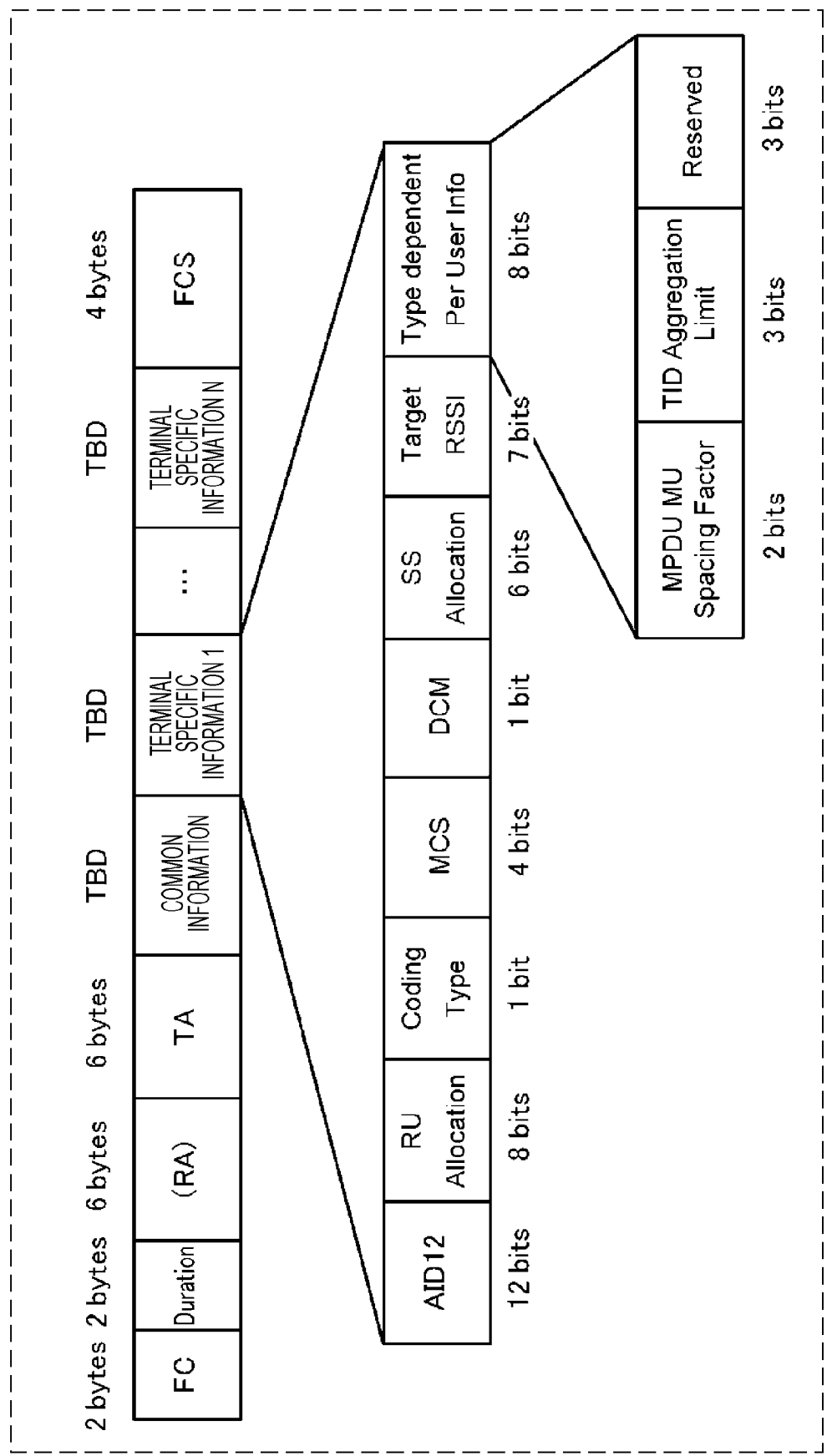
FIG. 24 illustrates an example of the format of TF and TF-R according to a fifth embodiment.

In 11ax, the format of TF and TF-R illustrated in FIG. 24 are being studied. This format includes one common information field and a terminal specific information (called "Per User Information") field for each of the terminals 200 for allocation RUs. Each of the terminal specific information fields includes the following subfields: AID 12 (12-bit AID), RU Allocation (RU allocation information), Coding Type (encoding type information), MCS, DCM (Dual Sub-Carrier Modulations (DCM) application flag), SS Allocation (spatial multiplexing information), Target RSSI (transmission power control information), and Type dependent Per User Info (Trigger Type dependent terminal information).

In addition, in 11ax, it is agreed that when the AID to be notified by using the AID12 subfield illustrated in FIG. 24 is 0, the RU to be notified in the terminal specific Information field is a Random access transmission RU. That is, an AID=1 to 2007 is used for Scheduled access transmission in which a transmission RU is controlled by the AP for each of the terminals, and AID=0 is used for Random access transmission. Accordingly, AIDs other than the above-described AIDs (2008 to 4095) in the 12-bit AID12 subfield are unused AIDs.

Furthermore, in 11ax, Basic Trigger that does not restrict the format of the UL response signal is defined as the Trigger Type information included in the common information. Basic Trigger allows a response by normal scheduled access and a response by random access. When the Trigger Type is Basic Trigger, the type dependent Per User Info subfield of the terminal specific information field includes the information illustrated in FIG. 24. That is, the Type dependent Per User Info subfield includes 2-bit MPDU MU Spacing Factor, which indicates a parameter indicating the minimum interval of a MPDU (MAC protocol data unit) that the AP can process, 3-bit TID Aggregation Limit, which indicates a parameter indicating the maximum number of TIDs to be included in the MPDU, and 3-bit Reserved bits. These are parameters for using an A-MPDU (Aggregate MAC protocol data unit) formed by concatenating a plurality of MPDUs as a UL response signal.

The inventors of the present disclosure have focused on the format of the above-described terminal specific information field so that new RA ID (Random access AID) and a RA ID table (information, such as the use purpose of RA) are defined. The configurations of the terminal and the access point according to the present embodiment are the same as those according to the first embodiment illustrated in FIG. 4 and FIG. 5. However, the present embodiment is characterized by a method for defining the RA ID table stored in the RA ID table storage unit 101 illustrated in FIG. 4 and the RA ID table storage unit 205 illustrated in FIG. 5.

According to the present embodiment, the structures of some fields included in the terminal specific Information field of the TF and TF-R formats illustrated in FIG. 24 are switched in accordance with the AID value notified by using the AID12 subfield. The operation is described in detail below.

Example 1 of RA ID Table

Figure 25:
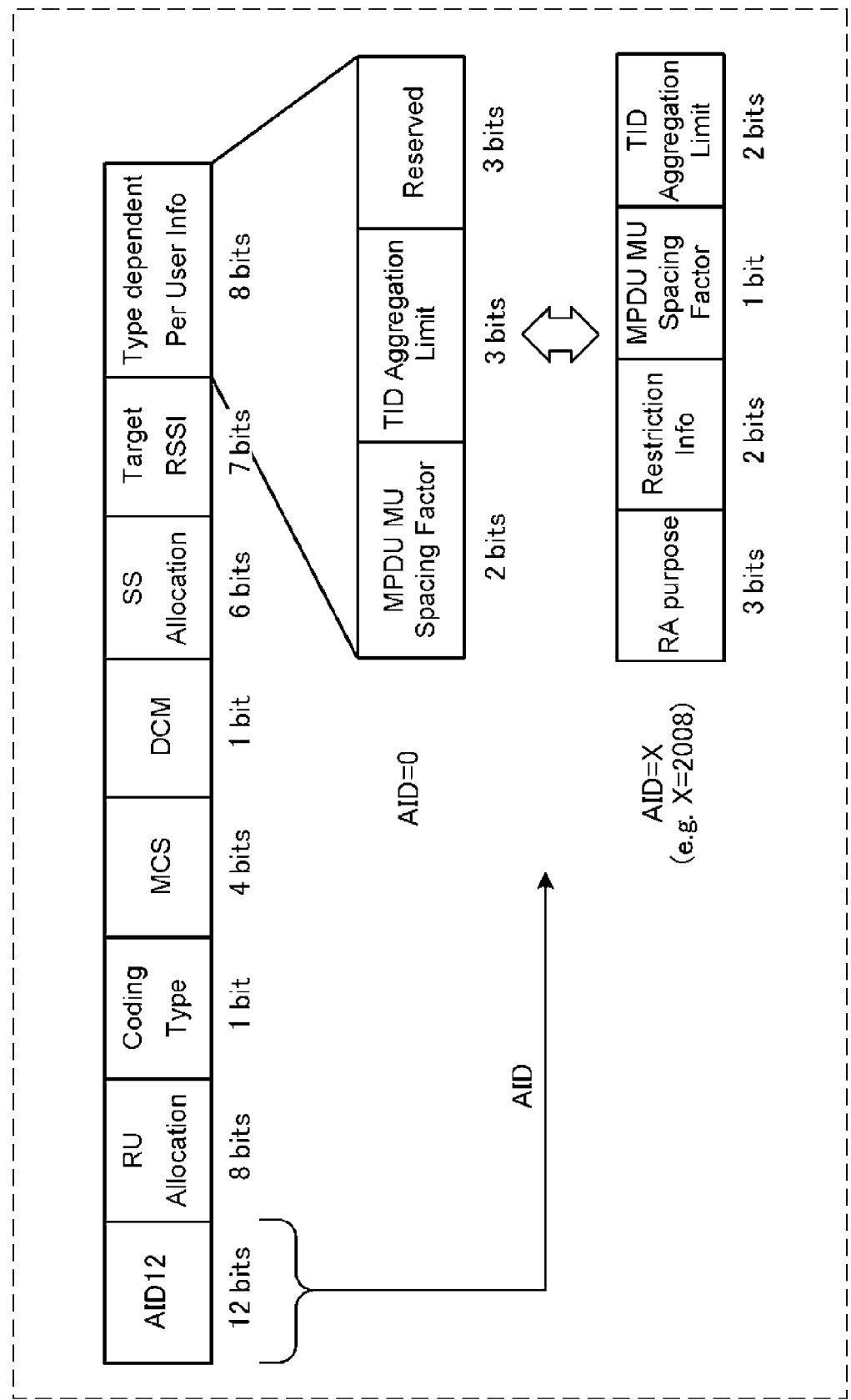
FIG. 25 illustrates an example of the structure of a per terminal information field when an RA ID table according to example 1 is used.

FIG. 25 illustrates an example of the structure of the terminal specific information field when an RA ID table according to example 1 is used. The operation performed when the RA ID table according to example 1 is used is described below with reference to FIG. 25.

As illustrated in FIG. 25, the structure of the Type dependent Per User Info subfield is switched depending on whether the value of AID notified by using the AID12 subfield is 0 or X (X is an integer in the range of 2008 to 4095, which are unused AIDs). When AID=0, it is determined that the RA is used for normal RA transmission of uplink data and, thus, information that is the same as in Scheduled access used to notify the information when AID=1 to 2007 is included in Type dependent Per User Info. In this case, A-MPDU formed by concatenating a plurality of MPDUs can be used for the UL response signal (the number of concatenated MPDUs is not limited to any value). In contrast, when AID=X (for example, X=2008), it is determined that the RA is used for RA transmission for a specific purpose and, thus, the information regarding the use purpose of RA and STA transmission conditions is included in Type dependent Per User Info. For example, as illustrated in FIG. 25, the following information is included: 3-bit information (RA purpose) indicating the use purpose of RA, such as a report of transmission buffer information (Buffer Status Report (BSR)) or a terminal Power headroom report, 2-bit information regarding the transmission restriction (Restriction Info, for example, three patterns of "transmitted by only a terminal of Class A", "transmitted by only a terminal of Class B", and "no restriction"), 1-bit MPDU MU Spacing Factor, and 2-bit TID Aggregation Limit. When the value of the AID indicates the specific use of the RA, it may be prohibited that the UL response signal includes uplink data. However, it may be acceptable for the UL response signal to include uplink data depending on the use purpose of the RA. For example, since the transmission buffer information is notified by using part of a normal data frame, the UL response signal can include uplink data. However, when the value of AID indicates a specific use of RA, the number of concatenated MPDUs included in the A-MPDU used to transmit uplink data is limited to a predetermined value less than the number of concatenated MPDUs acceptable when normal uplink data is transmitted. In this manner, the number of bits allocated to the MPDU MU Spacing factor and TID aggregation Limit can be reduced.

Figure 26:
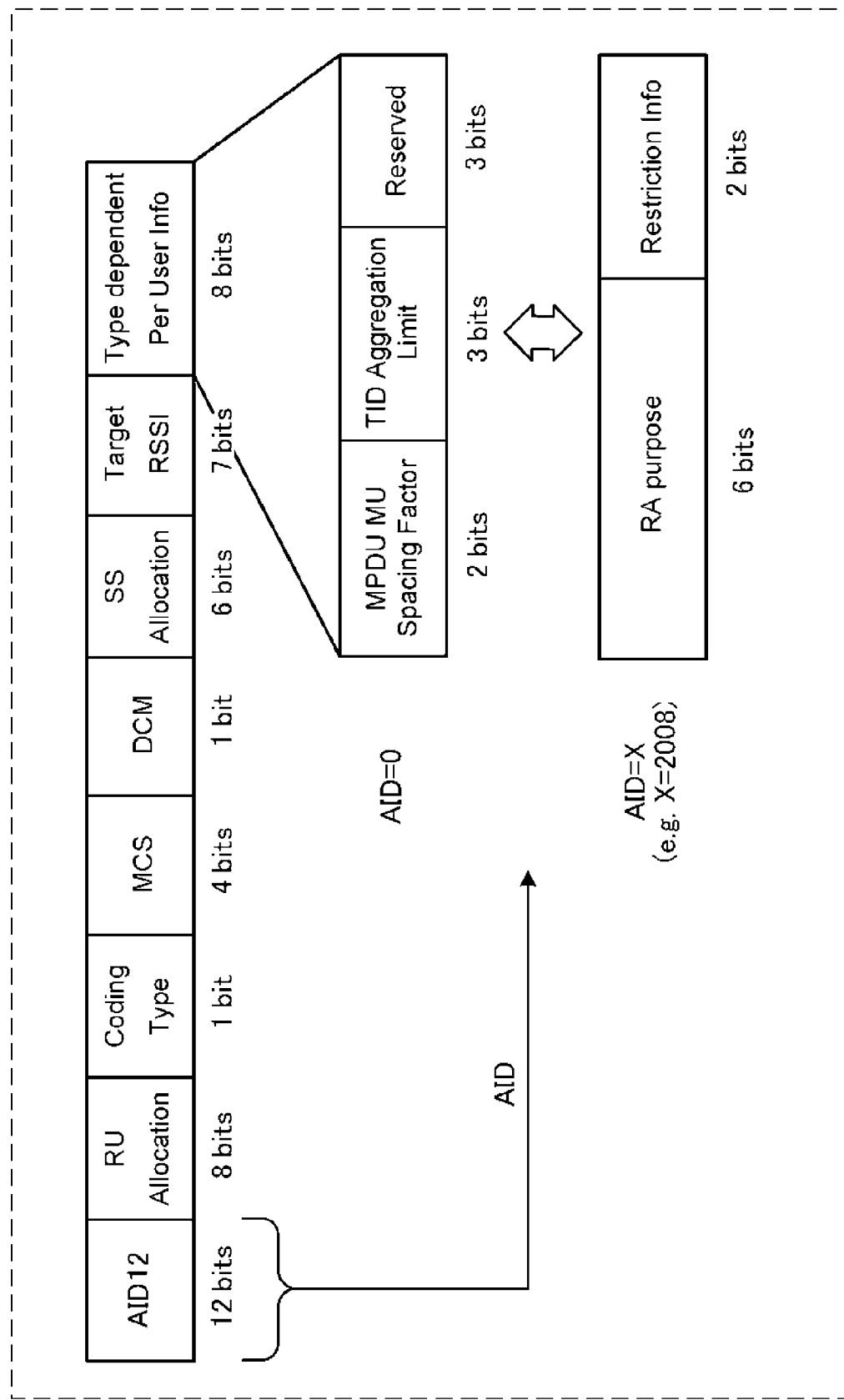
FIG. 26 illustrates another example of the structure of the per terminal information field when an RA ID table according to example 1 is used.

In addition, as illustrated in FIG. 26, when AID=X (X is any integer in the range of 2008 to 4095, which are unused AIDs), a 6-bit RA purpose subfield and a 2-bit subfield indicating, for example, information regarding the transmission restriction of a terminal may be included in Type dependent Per User Info as the information regarding the use purpose of the RA and STA transmission conditions. The RA of a use purpose of BSR or the like is mainly used to transmit a single MPDU (MAC Protocol Data Unit) having a small size. Thus, even when the MPDU MU Spacing Factor and the TID Aggregation Limit are set to fixed values under the assumption of the number of MPDUs=1 and are not notified, the impact on the performance is small. For example, when a BSR is requested, the frame of the UL response signal is limited to a QoS Data frame of a Single MPDU (a frame for transmitting user data by using a QoS (Quality of Service) function) or a QoS Null frame (a frame corresponding to a QoS Data frame not including data or QoS Data frame having a data size of zero). However, a frame formed by concatenating a plurality of QoS Null frames is acceptable. That is, it is prohibited for a terminal to transmit BSR by using an A-MPDU formed by concatenating a plurality of MPDUs including the entity of data (not QoS Null frames). In this manner, the need for notification of the MPDU MU Spacing Factor can be eliminated and, thus, the expandability and the efficiency are improved.

The above AID=X may be set so as to be AID=2048. An AID=2048 corresponds to a value obtained by setting only the MSB (Most Significant Bit) to 1 out of 12 bits of the AID12 subfield. As a result, the obtained information in the 12-bit AID12 subfield can be regarded as information in an 11-bit AID subfield and a 1-bit RA information switching flag. Thus, the reception processing can be simplified. By setting the 11-bit AID subfield such that AID=0, RA transmission is specified, as in an existing manner. Thereafter, it is determined whether to switch the structure of some of the fields included in the terminal specific information by using the RA information switching flag, which is the MSB of the AID12 subfield. Note that the RA information switching flag can be used for another purpose in the case of Scheduled access (when an AID=1 to 2007 is notified).

Alternatively, the above AID=X may be any one of AID=2008 to 2047. An AID=2008 to 2047 corresponds to an unused AID value that can be expressed by 11 bits. As a result, the MSB of the 12-bit AID12 subfield can be made an unused Reserved bit, which can be used for another use.

FIG. 27 illustrates an RA ID table according to example 1. As illustrated in FIG. 27, when AID=0, the RA type is data transmission RA. Information similar to that in Scheduled access is specified for the terminal by using the Type dependent Per User Info subfield. When AID=X (X is any integer in the range of 2008 to 4095), the RA type is RA transmission for a specific purpose. The detailed information regarding the RA is specified for the terminal by using the Type dependent Per User Info subfield.

As described above, according to an RA ID table of example 1, by switching the structure of the 8-bit Type dependent Per User Info subfield included in the terminal specific information in accordance with the value of AID, the RA use purpose and the RA transmission conditions which are instructions to the terminal can be expanded without increasing the amount of signaling.

Example 2 of RA ID Table

Figure 28:
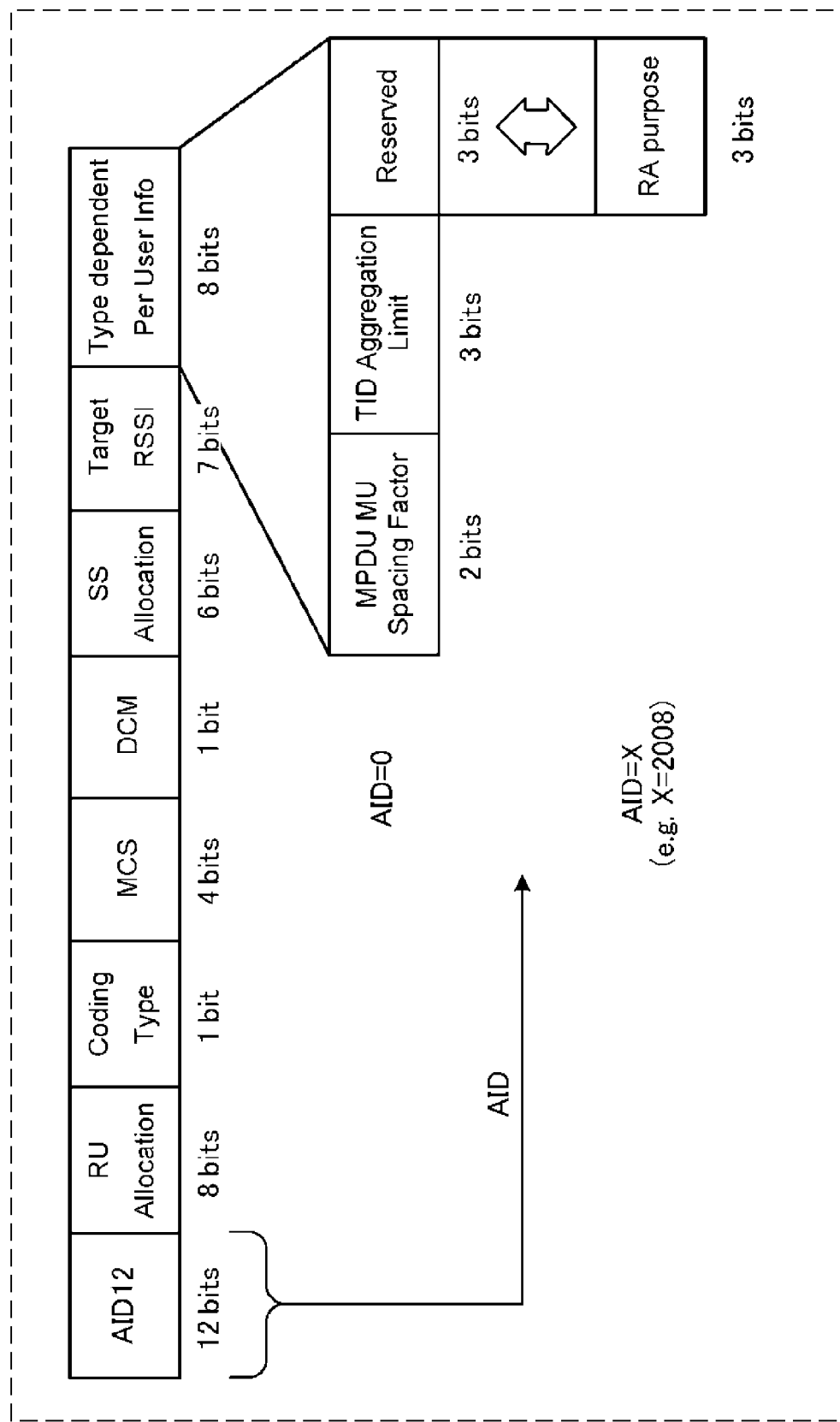
FIG. 28 illustrates an example of the structure of a terminal specific information field when an RA ID table according to example 2 is used.

FIG. 28 illustrates an example of the structure of the terminal specific information field when an RA ID table according to example 2 is used. The operation performed when the RA ID table according to example 2 is used is described below with reference to FIG. 28.

As illustrated in FIG. 28, the information in the Reserved subfield of the Type dependent Per User Info subfield is switched depending on whether the value of AID notified by using the AID12 subfield=0 or X (where X is defined in the same manner as in example 1 of the ID table). When AID=0, the same information as in Scheduled access is set, like the example 1 of the ID table. In contrast, when AID=X (for example, X=2008), it is determined that the RA is used for RA transmission for a specific purpose and, thus, the information regarding the use purpose of RA and STA transmission conditions is set in the Reserved subfield of the Type dependent Per User Info subfield. For example, as illustrated in FIG. 28, 3-bit information indicating the use purpose of RA (RA purpose) is set.

FIG. 29 illustrates the RA ID table according to example 2. As illustrated in FIG. 29, when AID=0, the RA type is RA for data transmission, and a predetermined fixed bit string is included in the Reserved subfield of the Type dependent Per User Info subfield, as in Scheduled access. When AID=X, the RA type is RA transmission for a specific purpose, and detailed information regarding RA purpose is specified for the terminal by using the Reserved subfield of the Type dependent Per User Info subfield.

As described above, according to the RA ID table according to example 2, by using the 3-bit Reserved subfield of the Type dependent Per User Info subfield, RA transmission for a specific purpose can be dictated to the terminal without increasing the amount of signaling if the number of use purposes of RA to be defined and the RA transmission conditions are small.

Example 3 of RA ID Table

Figure 30:
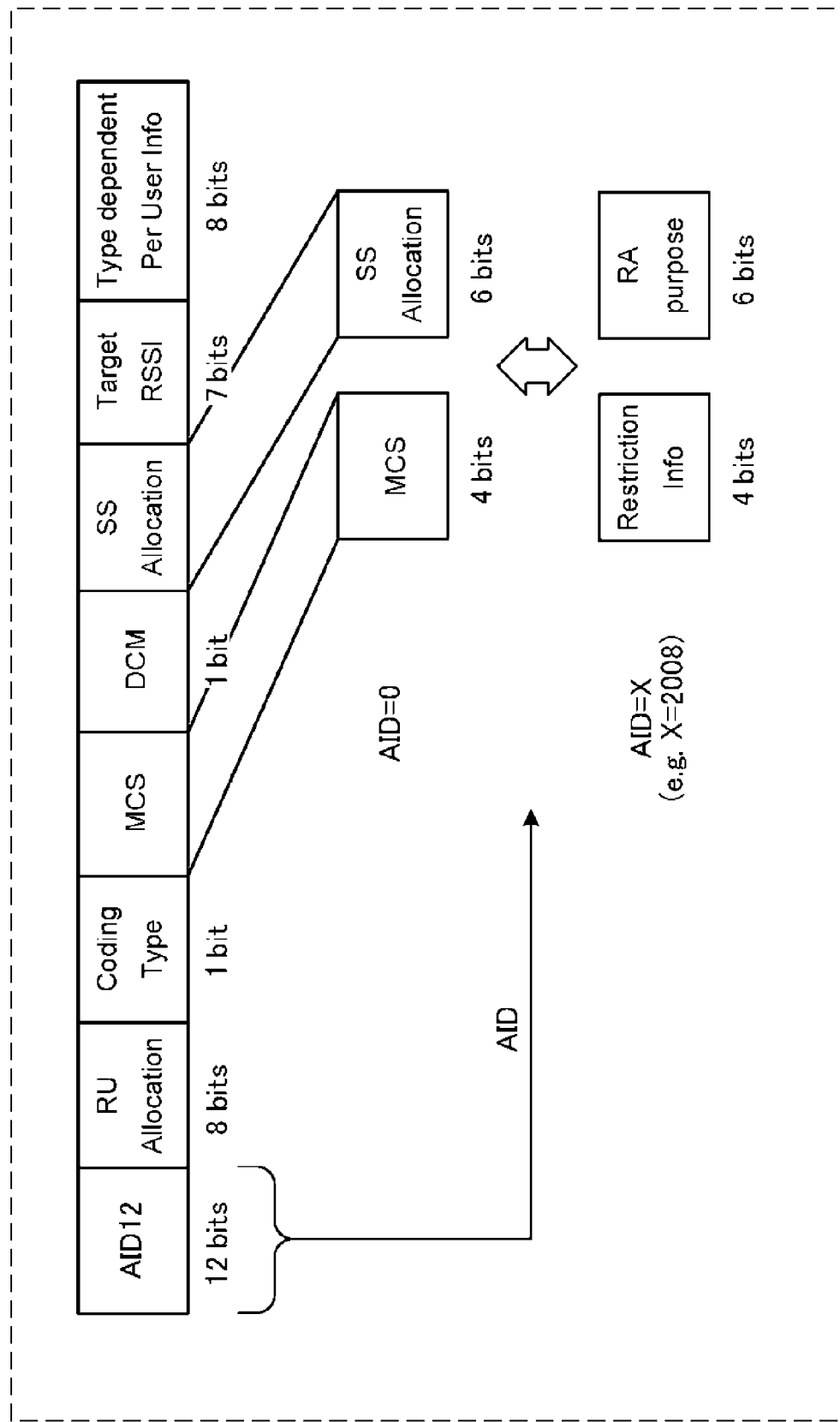
FIG. 30 illustrates an example of the structure of a terminal specific information field when an RA ID table according to example 3 is used.

FIG. 30 illustrates an example of the structure of a terminal specific information field when an RA ID table according to example 3 is used. The operation performed when an RA ID table according to example 3 is used is described below with reference to FIG. 30.

As illustrated in FIG. 30, the information in the MCS subfield and the SS Allocation subfield is switched depending on whether the value of AID notified by using the AID12 subfield=0 or X (where X is defined in the same manner as in example 1 of the ID table). When AID=0, the same information as in Scheduled access is set in the MCS subfield and the SS Allocation subfield, like example 1 of the ID table. In contrast, when AID=X (for example, X=2008), it is determined that the RA is used for RA transmission for a specific purpose and, thus, the information regarding the use purpose of RA (RA purpose) and STA transmission conditions is set in the SS Allocation subfield, and the information regarding the transmission restriction (Restriction Info) of the terminal is set in the MCS subfield. At this time, when RA transmission for a specific purpose is carried out, MCS and SS Allocation (number-of-spatial streams) information is fixed to the most robust transmission condition. More specifically, MCS adopts the lowest rate modulation scheme and coding rate, and the number of spatial streams is fixed to 1 (no multiplexing). In this manner, adequate reception quality is ensured even when any one of the terminals performs RA transmission for a specific purpose. In addition, in a RA for a specific purpose, such as BSR, since the transmission data size is relatively small, as compared with the size of normal data, the influence of an increase in overhead of use of a radio resource is small even when the transmission condition is fixed to the most robust transmission condition.

FIG. 31 illustrates the RA ID table according to example 3. As illustrated in FIG. 31, when AID=0, the RA type is RA for data transmission. Information that is the same as in Scheduled access is set in the MCS subfield and the SS Allocation subfield and is dictated to the terminal. When AID=X, the RA type is RA transmission for a specific purpose. Detailed information regarding RA is set in the MCS subfield and the SS Allocation subfield and is dictated to the terminal. In addition, when AID=X, predetermined fixed values are applied to MCS and the number of spatial streams.

In this manner, in an RA ID table according to example 3, by switching the information to be transmitted by using the 4-bit MCS sub-field and the 6-bit SS Allocation subfield in accordance with the value of AID, the number of use purposes of the RA and the expandability of the RA transmission condition can be increased. Note that when the number of use purposes of RA and the number of RA transmission conditions to be defined are small, the information in only one of the MCS subfield and the SS Allocation subfield may be switched.

Example 4 of RA ID Table

Figure 32:
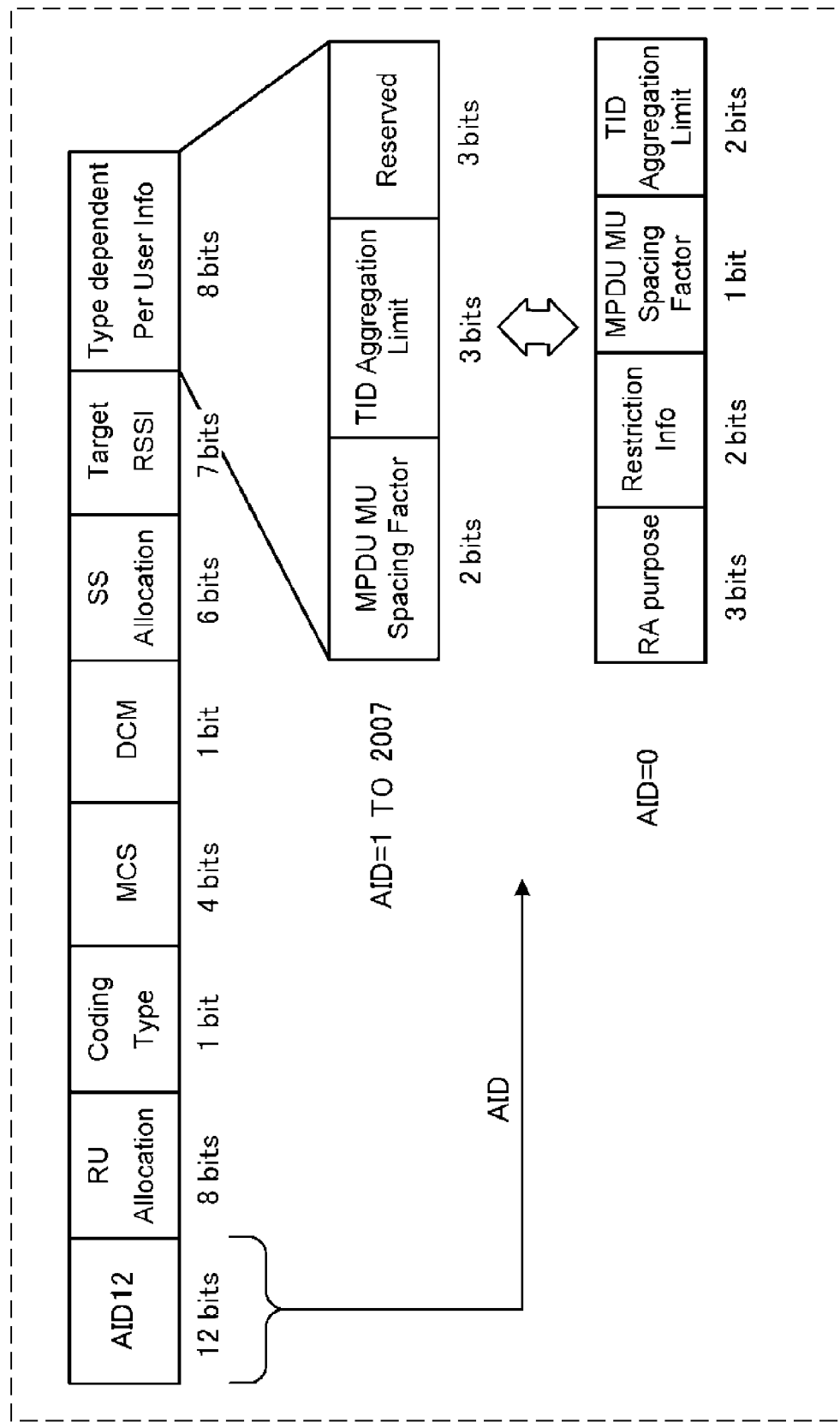
FIG. 32 illustrates an example of the structure of a terminal specific information field when an RA ID table according to example 4 is used.

FIG. 32 illustrates an example of the structure of the terminal specific information field when an RA ID table according to example 4 is used. The operation performed when the RA ID table according to example 4 is used is described below with reference to FIG. 32.

As illustrated in FIG. 32, the information in some of the subfields included in the terminal specific information field of the TF and TF-R format is switched depending on whether the value of the AID notified by using the AID12 subfield is one of 1 to 2007 or 0. In FIG. 32, like the RA ID table according to example 1, the information to be transmitted is switched by the information in the Type dependent Per User Information subfield of the terminal specific information field.

FIG. 33 illustrates an RA ID table according to example 4. As illustrated in FIG. 33, when the value of AID is a value in the range of 1 to 2007 (in Scheduled access transmission), the information regarding MPDU MU Spacing Factor and TID Aggregation Limit is set in the Type dependent Per User Info subfield. In contrast, when AID=0 (in RA transmission), it is determined that RA is to be used for RA transmission for a specific purpose and RA transmission for data transmission. Like the RA ID table according to example 1, the use purpose of RA and STA transmission conditions are set in the Type dependent Per User Info.

In this manner, in the RA ID table according to example 4, by switching the information to be transmitted by using the 8-bit Type dependent Per User Info subfield in accordance with the value of AID, the number of use purposes of RA and the number of RA transmission conditions dictated to the terminal can be increased without increasing the amount of signaling. Note that while the example has been described with reference to switching of the information transmitted by using the Type dependent Per User Info subfield, the switching scheme is not limited thereto. Like examples 2 and 3 of the RA ID table, even when the information transmitted by using another subfield included in the Per User Info field is switched, the same effect can be obtained.

Figure 34:
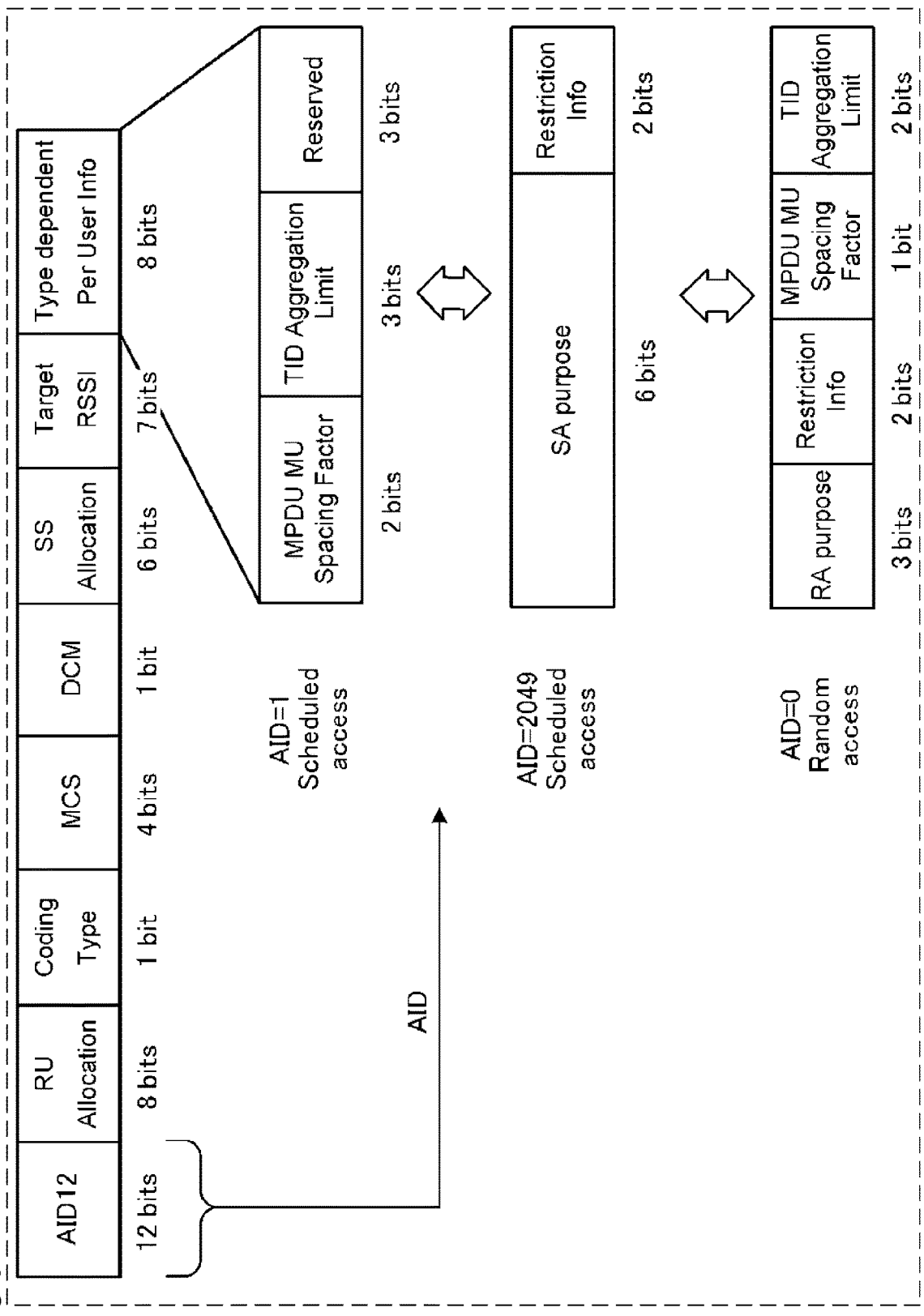
FIG. 34 illustrates an example of the structure of a terminal specific information field in Scheduled Access.

While examples 1 to 4 of the RA ID table have been described with reference to switching of the information transmitted by using some of the subfields included in the Per User Information field in RA transmission, examples are not limited thereto. The switching of information may be applied to transmission through Scheduled access. As illustrated in FIG. 34, the information in the Type dependent Per User Info subfield in Scheduled access is switched depending on whether the value of AID notified by using the AID12 subfield is a value in the range of 1 to 2007 or Y+1 to Y+2007 (Y is any value greater than or equal to the maximum value of the existing AID for Scheduled access and is less than or equal to the value of 12 bits, that is, 2007 to 2088). For example, the value of Y is set to 2048. In this manner, the AID of the terminal is notified by using 11 bits of AID12 subfield, and it is determined whether part of information in the Per User Info field is to be switched by using the MSB of the AID12 subfield. Thus, the processing can be simplified.

In FIG. 34, when AID=1, information regarding MPDU MU Spacing Factor and TID Aggregation Limit is set in the Type dependent Per User Info subfield for ordinary scheduled access performed by a terminal having AID=1. When AID=2048+1=2049, the use purpose of Scheduled access ("SA purpose" in FIG. 34) and information indicating STA transmission conditions ("Restriction Info" in FIG. 34), for example, are set in the Type dependent Per User Info subfield for Scheduled access for a specific purpose performed by a terminal having AID=1. As illustrated in FIG. 34, when the main use purpose of Scheduled access for a specific purpose is transmitting a single MPDU with a small size, influence on the performance is small even if MPDU MU Spacing Factor and TID Aggregation Limit are set to fixed values (no notification) determined on the assumption of the number of MPDUs=1. In contrast, when AID=0, information indicating the use purpose of RA (RA purpose in the drawing) and the STA transmission condition (Restriction Info in the drawing) are set in the Type dependent Per User Info subfield for Random access. In this manner, even in Scheduled access, scheduled access transmission for a specific purpose can be dictated to the terminal without increasing the amount of signaling.

The embodiments of the present disclosure have been described above.

Other Embodiments (1) The same effect can be obtained by combining the above-described embodiments. For example, as illustrated in FIG. 19, an RA ID may be uniquely associated with a pair consisting of an RA type and the reception quality. Alternatively, an RA ID may be uniquely associated with a pair consisting of the traffic type and the reception quality (not illustrated). Still alternatively, part of the transmission format illustrated in FIG. 7 may correspond to the type of RA ID. For example, the first bit may be assigned for identification of type A and the second bit may be assigned for identification of type B.

(2) In each of the embodiments described above, the RA ID that is uniquely associated with the reception quality, the RA type, or the traffic type is defined. However, an RA ID that is not associated with any of the reception quality, RA type, or traffic type may be defined and is set in the RA ID table. For example, in the RA ID table illustrated in FIG. 23, when the reception quality is high (for example, the SNR is 10 dB or higher), an RA ID=2008 is associated. When the reception quality is low (for example, the SNR is lower than 10 dB), an RA ID=2009 is associated, and an RA ID=2010 is associated with any one of the RA IDs that does not depend on the reception quality.

For example, a terminal having a high reception quality may randomly select one of the RUs having an RA ID=2008 assigned thereto and the RUs having an RA ID=2010 assigned thereto and transmit a UL response signal. In this manner, if the distribution of the reception quality of terminals accommodated by the access point 100 is biased and, thus, the collision rate of random access increases, an arbitrary ID (an RA ID=2010 in FIG. 23) is used as the RA ID. Thus, an increase in collision rate of random access can be prevented.

(3) According to the above-described embodiments, an aspect of the present disclosure is realized by a hardware configuration, the present disclosure can be provided by software in cooperation with hardware.

(4) The RA ID according to the above-described embodiments is also referred to as a Random access AID.

(5) Terminals not having the AID (a terminal not associated with an AP) may perform transmission through Random access by using an RU indicated by the RA ID according to the above-described embodiment. These terminals can perform transmission by using a random access RU having no restriction on the type and the use purpose. In addition, the terminal type/use purpose and transmission restriction for terminals not having an AID may be defined. For example, as one of the RA types, a specific RA ID may be assigned to a purpose for a terminal not having an AID to transmit an Association Request. Furthermore, in the RA transmission for a specific purpose according to the fifth embodiment, transmission of Association Request may be dictated by using the use purpose indicated by Per User Info (RA purpose), and transmission may be allowed for only a terminal having no AID by using transmission restriction (Restriction Info).

In addition, each of the functional blocks used to describe the above embodiments are typically provided as LSIs which are integrated circuits. The integrated circuit may control each of the functional block used to describe the above embodiments and may have an input and an output. The integrated circuits may be formed as individual chips or may be integrated into one chip so as to include some or all of the integrated circuits. The term "LSI" is used herein, but the terms "IC", "system LSI", "super LSI" or "ultra LSI" may be also used depending on the level of integration.

In addition, the circuit integration is not limited to LSI and may be accomplished by dedicated circuitry or a general-purpose processor other than an LSI. A field programmable gate array (FPGA), which is programmable after fabrication of the LSI, or a reconfigurable processor which allows reconfiguration of connections and settings of circuit cells in LSI may be used.

Moreover, should a circuit integration technology replacing LSI appear as a result of advancements in semiconductor technology or other technologies derived from the technology, the functional blocks could be integrated by using such a technology. Another possibility is the application of biotechnology, for example.

A communication apparatus according to the present disclosure includes signal generation circuitry which, in operation, generates a control signal including a plurality of user specific fields, each of the plurality of user specific fields including an Association ID (AID) subfield for specifying a corresponding terminal station, and a resource unit allocation subfield indicating at least one resource unit available for the corresponding terminal station, and transmission circuitry which, in operation, transmits the control signal, wherein one of a plurality of AIDs for scheduled access or one of a plurality of random access IDs for random access is assigned to the AID subfield in each of the plurality of user specific fields, values for the plurality of random access IDs are different from any of values of the plurality of the AIDs for the scheduled access, and each value of the plurality of random access IDs indicates a type of a terminal station which can perform random access to the at least one resource unit.

In the communication apparatus according to the present disclosure, one of the plurality of random access IDs indicates a terminal station not associated with the communication apparatus.

In the communication apparatus according to the present disclosure, values for the plurality of random access IDs include at least one of 0 and an integer from 2008 to 2047.

In the communication apparatus according to the present disclosure, when one of the plurality of random access IDs is assigned to the AID subfield, the resource unit allocation subfield corresponding to the AID subfield indicates one or more resource units which can be accessed by a terminal station specified by the AID subfield through random access, and the specified terminal station randomly selects one resource unit from the indicated one or more resource units which can be accessed through random access.

In the communication apparatus according to the present disclosure, the control signal includes a user common field, and the user common field includes a trigger type subfield indicating a type of the control signal.

In the communication apparatus according to the present disclosure, the user specific field includes Target RSSI subfield indicating target reception power of a signal transmitted in response to the control signal.

In the communication apparatus according to the present disclosure, when one of the plurality of random access IDs is allocated to the AID subfield, the user specific field including the allocated random access ID includes a subfield to which a value corresponding to a Traffic class indicating a traffic type of information transmitted through random access is allocated.

In the communication apparatus according to the present disclosure, each value of the plurality of random access IDs is associated with communication condition information between the communication apparatus and the terminal station, and the communication condition information indicating at least one of uplink transmission buffer amount, path loss, reception quality, RSSI and interference power.

In the communication apparatus according to the present disclosure, each value of the plurality of random access IDs is associated with a type of information transmitted through random access, a transmission power class of the terminal station, or setting accuracy of transmission power required for the terminal station.

A terminal station according to the present disclosure includes signal receiving circuitry which, in operation, receives a control signal including a plurality of user specific fields, each of the plurality of user specific fields including an Association ID (AID) subfield for specifying a corresponding terminal station, and a resource unit allocation subfield indicating at least one resource unit available for the corresponding terminal station, and selection circuitry which, in operation, randomly selects one resource unit from the at least one resource unit indicated by a corresponding resource unit allocation subfield when the received control signal includes the user specific field including AID subfield to which one of the plurality of random access IDs is allocated, transmission circuitry which, in operation, transmits an uplink signal by using the selected one resource unit, wherein values for the plurality of random access IDs are different from any of values of the plurality of the AIDs for the scheduled access, and each value of the plurality of random access IDs indicates a type of a terminal station which can perform random access to the at least one resource unit.

A communication method according to the present disclosure includes generating a control signal including a plurality of user specific fields, each of the plurality of user specific fields including an Association ID (AID) subfield for specifying a corresponding terminal station, and a resource unit allocation subfield indicating at least one resource unit available for the corresponding terminal station, and transmitting the control signal, wherein one of a plurality of AIDs for scheduled access or one of a plurality of random access IDs for random access is assigned to the AID subfield in each of the plurality of user specific fields, values for the plurality of random access IDs are different from any of values of the plurality of the AIDs for the scheduled access, and each value of the plurality of random access IDs indicates a type of a terminal station which can perform random access to the at least one resource unit.

A communication method according to the present disclosure includes receiving a control signal including a plurality of user specific fields, each of the plurality of user specific fields including an Association ID (AID) subfield for specifying a corresponding terminal station, and a resource unit allocation subfield indicating at least one resource unit available for the corresponding terminal station, and randomly selecting one resource unit from the at least one resource unit indicated by a corresponding resource unit allocation subfield when the received control signal includes the user specific field including AID subfield to which one of the plurality of random access IDs is assigned transmitting an uplink signal by using the selected one resource unit, wherein values for the plurality of random access IDs are be different from any of values of the plurality of the AIDs for the scheduled access, and each value of the plurality of random access IDs indicates a type of a terminal station which can perform random access to the at least one resource unit.

An aspect of the present disclosure is effective for improving the system performance by highly accurately performing scheduling of DL Data/UL Data after random access while reducing an increase in overhead of a UL response signal caused by the random access.

What is claimed is:

1. A communication apparatus, comprising:
   circuitry, which, in operation, generates a control signal including a plurality of user specific fields, each of the plurality of user specific fields including an ID field which indicates that at least one resource unit (RU) is allocated to a corresponding terminal station; and
   a transmitter, which is coupled to the circuitry and which, in operation, transmits the control signal, wherein each of the ID fields indicates one of a plurality of Association IDs (AIDs) for scheduled access or one of a plurality of IDs for random access,
   wherein values of the plurality of IDs for random access are different from any of values of the plurality of AIDs for scheduled access, and each of the values of the plurality of IDs for random access indicates a state of communication between the communication apparatus and the corresponding terminal station.

2. The communication apparatus according to claim 1, wherein one of the values of the plurality of IDs for random access indicates a terminal station not associated with the communication apparatus.

3. The communication apparatus according to claim 1, wherein the values of the plurality of IDs for random access include at least one of 0 and integers from 2008 to 2047.

4. The communication apparatus according to claim 1, wherein when the ID field indicates one of the plurality of IDs for random access, the ID field indicates one or more resource units (RUs), one of which is randomly selected by the corresponding terminal station.

5. The communication apparatus according to claim 1, wherein the control signal includes a common information field, wherein the common information field includes a trigger type field indicating a type of the control signal.

6. The communication apparatus according to claim 1, wherein the user specific fields include a Target RSSI field indicating target reception power of a signal transmitted in response to the control signal.

7. The communication apparatus according to claim 1, wherein when the ID field indicates one of the plurality of IDs for random access, the control signal includes a value corresponding to a traffic type of information transmitted through random access.

8. The communication apparatus according to claim 1, wherein each of the value of the plurality of IDs for random access is associated with communication condition information between the communication apparatus and the corresponding terminal station, wherein the communication condition information indicates at least one of an uplink transmission buffer amount, path loss, reception quality, received signal strength indicator (RSSI), and interference power.

9. The communication apparatus according to claim 1, wherein each of the values of the plurality of IDs for random access is associated with a type of information transmitted through random access, with a transmission power class of the corresponding terminal station, or with setting accuracy of transmission power required for the corresponding terminal station.

10. A communication method implemented by a communication apparatus, the method comprising:
    generating a control signal including a plurality of user specific fields, each of the plurality of user specific fields including an field which indicates that at least one resource unit (RU) is allocated to a corresponding terminal station; and
    transmitting the control signal, wherein each of the ID fields indicates one of a plurality of Association IDs (AIDs for scheduled access or one of a plurality of IDs for random access,
    wherein values of the plurality of IDs for random access are different from any of values of the plurality of AIDs for scheduled access, and each of the values of the plurality of IDs for random access indicates a state of communication between the communication apparatus and the corresponding terminal station.

11. The method according to claim 10, wherein one of the values of the plurality of IDs for random access indicates a terminal station not associated with the communication apparatus.

12. The method according to claim 10, wherein the values of the plurality of IDs for random access include at least one of 0 and integers from 2008 to 2047.

13. The method according to claim 10, wherein when the ID field indicates one of the plurality of IDs for random access, the ID field indicates one or more resource units (RUs), one of which is randomly selected by the corresponding terminal station.

14. The method according to claim 10, wherein the control signal includes a common information field, wherein the common information field includes a trigger type field indicating a type of the control signal.

15. The method according to claim 10, wherein the user specific fields include a Target RSSI field indicating target reception power of a signal transmitted in response to the control signal.

16. The method according to claim 10, wherein when the ID field indicates one of the plurality of IDs for random access, the control signal includes a value corresponding to a traffic type of information transmitted through random access.

17. The method according to claim 10, wherein each of the value of the plurality of IDs for random access is associated with communication condition information between the communication apparatus and the corresponding terminal station, wherein the communication condition information indicates at least one of an uplink transmission buffer amount, path loss, reception quality, received signal strength indicator (RSSI), and interference power.

18. The method according to claim 10, wherein each of the values of the plurality of IDs for random access is associated with a type of information transmitted through random access, with a transmission power class of the corresponding terminal station, or with setting accuracy of transmission power required for the corresponding terminal station.

19. The method according to claim 10, wherein the user specific fields include an RU allocation field indicating at least one RU that is allocated to the corresponding terminal station.

20. The communication apparatus according to claim 1, wherein the user specific fields include an RU allocation field indicating at least one RU that is allocated to the corresponding terminal station.

* * * * *

UNITED STATES PATENT AND TRADEMARK OFFICE
CERTIFICATE OF CORRECTION

PATENT NO. : 10,708,954 B2
APPLICATION NO. : 15/947592
DATED : July 7, 2020
INVENTOR(S) : Takashi Iwai et al.

Page 1 of 1

It is certified that error appears in the above-identified patent and that said Letters Patent is hereby corrected as shown below:

In the Claims

Column 36, Claim 10, Line 15:
"including an field which indicates" should read: --including an ID field which indicates--.

Column 36, Claim 10, Line 20:
"(AIDs for scheduled" should read: --(AIDs) for scheduled--.

Signed and Sealed this
Twenty-fifth Day of August, 2020

Andrei Iancu
*Director of the United States Patent and Trademark Office*